(12) United States Patent
Burch et al.

(10) Patent No.: US 8,072,115 B2
(45) Date of Patent: Dec. 6, 2011

(54) FOIL COIL STRUCTURES AND METHODS FOR WINDING THE SAME FOR AXIAL-BASED ELECTRODYNAMIC MACHINES

(75) Inventors: Donald Burch, Los Altos, CA (US); John Petro, Los Altos, CA (US)

(73) Assignee: Novatorque, Inc., Sunnyvale, CA (US)

( * ) Notice: Subject to any disclaimer, the term of this patent is extended or adjusted under 35 U.S.C. 154(b) by 178 days.

(21) Appl. No.: 12/156,789

(22) Filed: Jun. 3, 2008

(65) Prior Publication Data
US 2008/0315708 A1    Dec. 25, 2008

Related U.S. Application Data

(60) Provisional application No. 60/933,589, filed on Jun. 7, 2007.

(51) Int. Cl.
*H02K 3/28* (2006.01)
*H02K 3/04* (2006.01)
*H02K 3/00* (2006.01)
*H02K 19/26* (2006.01)
*H02K 1/12* (2006.01)
*H02K 1/14* (2006.01)

(52) U.S. Cl. ............... 310/208; 310/195; 310/254.1

(58) Field of Classification Search ............... 310/208, 310/179, 184, 195, 198, 254.1; *H02K 3/00, H02K 3/04, 19/26, 21/16, 1/12, 1/14*
See application file for complete search history.

(56) References Cited

U.S. PATENT DOCUMENTS

| | | | | |
|---|---|---|---|---|
| 6,011,339 | A * | 1/2000 | Kawakami | 310/208 |
| 6,724,117 | B1 * | 4/2004 | Lungu | 310/179 |
| 6,791,670 | B2 * | 9/2004 | Miyajima et al. | 355/72 |
| 2003/0030339 | A1 | 2/2003 | Dombrovski | |
| 2003/0102769 | A1 | 6/2003 | Calley | |
| 2003/0132045 | A1 | 7/2003 | Rajasingham | |
| 2004/0174082 | A1 | 9/2004 | Graham | |
| 2005/0225197 | A1 * | 10/2005 | Nagano et al. | 310/254 |
| 2006/0087188 | A1 * | 4/2006 | Petro et al. | 310/156.38 |
| 2006/0238058 | A1 * | 10/2006 | Koide et al. | 310/156.55 |
| 2007/0085442 | A1 | 4/2007 | Petro et al. | |

FOREIGN PATENT DOCUMENTS

| JP | 55163819 | A | * | 12/1980 |
|---|---|---|---|---|
| JP | 07095737 | A | * | 4/1995 |

OTHER PUBLICATIONS

Young, Lee W., Notification of Transmittal of the International Search Report and the Written Opinion of the International Searching Authority, or the Declaration, Sep. 2, 2008, PCT Application Serial No. PCT/US2008/066117.

* cited by examiner

*Primary Examiner* — Quyen Leung
*Assistant Examiner* — Michael Andrews
(74) *Attorney, Agent, or Firm* — Kokka & Backus, PC

(57) ABSTRACT

Disclosed are foil coil structures and methods for winding the same for stators in electrodynamic machines, as well as electrodynamic machines that implement such coil structures. In one embodiment, a foil coil structure is configured for implementation with a field pole member having pole faces that confront, for example, conical magnets.

19 Claims, 28 Drawing Sheets (e.g. 9 Field Pole: 6 Magnet Pole Configuration)

(e.g. 12 Field Pole:8 Magnet Pole Configuration)

US 8,072,115 B2

FOIL COIL STRUCTURES AND METHODS FOR WINDING THE SAME FOR AXIAL-BASED ELECTRODYNAMIC MACHINES

CROSS REFERENCE TO RELATED APPLICATIONS

This application claims the benefit of U.S. Provisional Application No. 60/933,589, entitled "Foil Coil Structures and Methods for Winding the Same for Axial-Based Electrodynamic Machines" and filed on Jun. 7, 2007. This application incorporates by reference U.S. Nonprovisional application Ser. No. 11/021,417, entitled "Rotor-Stator Structure for Electrodynamic Machines," filed on Dec. 23, 2004 and issued as U.S. Pat. No. 7,061,152 on Jun. 13, 2006, and U.S. Nonprovisional application Ser. No. 11/255,404, entitled "Rotor-Stator Structure for Electrodynamic Machines," filed on Oct. 20, 2005, issued as U.S. Pat. No. 7,294,948 on Nov. 13, 2007. This application also incorporates by reference U.S. Provisional Application No. 60/773,500, entitled "Field Pole Member for Electrodynamic Machines," filed on Feb. 14, 2006, and U.S. Nonprovisional application Ser. No. 11/707,817, entitled "Field Pole Members for Electrodynamic Machines and Methods of Forming Same" and filed on Feb. 12, 2007.

BRIEF DESCRIPTION OF THE INVENTION

Various embodiments of the invention relates generally to electrodynamic machines and the like, and more particularly, to foil coil structures and methods for winding the same for stators in electrodynamic machines.

BACKGROUND OF THE INVENTION

While traditional structures for electrodynamic machines, such as axial motors and generators, are functional, they have several drawbacks in their implementation. Generally, conventional stators do not provide for optimal structures for generating ampere-turn ("AT") flux. For example, traditional stators use coils typically consisting of wires having circular cross-sections, each wire individually wrapped around a component of the stator without regard to other components. It would be desirable to provide improved techniques and structures that minimize one or more of the drawbacks associated with axial motors and generators.

SUMMARY OF THE INVENTION

Disclosed are foil coil structures and methods for winding the same for stators in electrodynamic machines, as well as electrodynamic machines that implement such coil structures. In one embodiment, a foil coil structure is configured for implementation with field pole members having pole faces that confront, for example, conical magnets.

BRIEF DESCRIPTION OF THE FIGURES

The invention and its various embodiments are more fully appreciated in connection with the following detailed description taken in conjunction with the accompanying drawings, in which:

FIGS. 15 to 18B depict various implementations of a coil structure implementing a variable width foil conductor, according to various embodiments of the invention;

Like reference numerals refer to corresponding parts throughout the several views of the drawings. Note that most of the reference numerals include one or two left-most digits that generally identify the figure that first introduces that reference number.

DETAILED DESCRIPTION

Definitions

Figure 1:
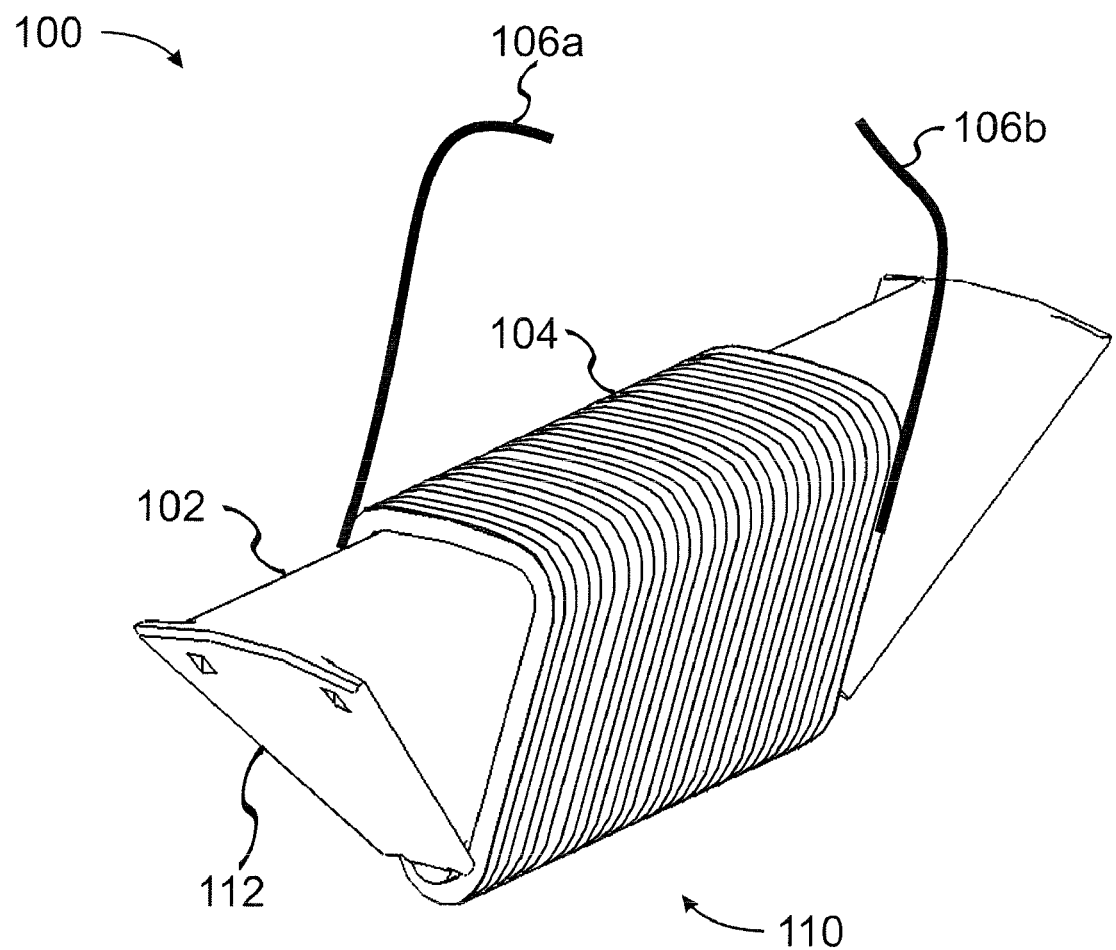
FIGS. 1 and 2 depict examples of active field pole members, according to embodiments of the invention.

The following definitions apply to some of the elements described with respect to some embodiments of the invention. These definitions may likewise be expanded upon herein.

As used herein, the term "air gap" refers, at least in one embodiment, to a space, or a gap, between a magnet surface and a confronting pole face. Such a space can be physically described as a volume bounded at least by the areas of the magnet surface and the pole face. An air gap functions to enable relative motion between a rotor and a stator, and to define a flux interaction region. Although an air gap is typically filled with air, it need not be so limiting.

As used herein, the term "back-iron" commonly describes a physical structure (as well as the materials giving rise to that physical structure) that is often used to complete an otherwise open magnetic circuit. In particular, back-iron structures are generally used only to transfer magnetic flux from one magnetic circuit element to another, such as either from one magnetically permeable field pole member to another, or from a magnet pole of a first magnet to a magnet pole of a second magnet, or both, without an intervening ampere-turn generating element, such as coil, between the field pole members or the magnet poles. Furthermore, back-iron structures are not generally formed to accept an associated ampere-turn generating element, such as one or more coils.

As used herein, the term "coil" refers, at least in one embodiment, to an assemblage of successive convolutions of a conductor arranged to inductively couple to a magnetically permeable material to produce magnetic flux. In some embodiments, the term "coil" can be described as a "winding" or a "coil winding." The term "coil" can also refer to foil coils. In at least some embodiments, the term "foil coil" can refer to conductors having any cross-sectional shape. An example of a foil coil is a planar-shaped conductor that is relatively flat. In other examples, a foil coil can be monolithic in structure, or can be composed of a number of conductors that collectively have a non-circular cross-section.

As used herein, the term "coil region" refers generally, at least in one embodiment, to a portion of a field pole member around which a coil is wound.

As used herein, the term "core" refers to, at least in one embodiment, a portion of a field pole member where a coil is normally disposed between pole shoes and is generally composed of a magnetically permeable material for providing a part of a magnetic flux path. The term "core," at least in one embodiment, can refer, in the context of a coil structure, to a structure configured to support magnetic regions. As such, the term core can be interchangeable with the term "hub."

As used herein, the term "field pole member" refers generally, at least in one embodiment, to an element composed of a magnetically permeable material and being configured to provide a structure around which a coil can be wound (i.e., the element is configured to receive a coil for purposes of generating magnetic flux). In particular, a field pole member includes a core (i.e., core region) and at least one pole shoe, each of which is generally located near a respective end of the core. Without more, a field pole member is not configured to generate ampere-turn flux. In some embodiments, the term "field pole member" can be described generally as a "stator-core."

As used herein, the term "active field pole member" refers, at least in one embodiment, to an assemblage of a core, one or more coils, and at least two pole shoes. In particular, an active field pole member can be described as a field pole member assembled with one or more coils for selectably generating ampere-turn flux. In some embodiments, the term "active field pole member" can be described generally as a "stator-core member."

As used herein, the term "ferromagnetic material" refers, at least in one embodiment, to a material that generally exhibits hysteresis phenomena and whose permeability is dependent on the magnetizing force. Also, the term "ferromagnetic material" can also refer to a magnetically permeable material whose relative permeability is greater than unity and depends upon the magnetizing force.

As used herein, the term "field interaction region" refers, at least in one embodiment, to a region where the magnetic flux developed from two or more sources interact vectorially in a manner that can produce mechanical force and/or torque relative to those sources. Generally, the term "flux interaction region" can be used interchangeably with the term "field interaction region." Examples of such sources include field pole members, active field pole members, and/or magnets, or portions thereof. Although a field interaction region is often referred to in rotating machinery parlance as an "air gap," a field interaction region is a broader term that describes a region in which magnetic flux from two or more sources interact vectorially to produce mechanical force and/or torque relative to those sources, and therefore is not limited to the definition of an air gap (i.e., not confined to a volume defined by the areas of the magnet surface and the pole face and planes extending from the peripheries between the two areas). For example, a field interaction region (or at least a portion thereof) can be located internal to a magnet.

As used herein, the term "generator" generally refers, at least in one embodiment, to an electrodynamic machine that is configured to convert mechanical energy into electrical energy regardless of, for example, its output voltage waveform. As an "alternator" can be defined similarly, the term generator includes alternators in its definition.

As used herein, the term "magnet" refers, at least in one embodiment, to a body that produces a magnetic field externally unto itself. As such, the term magnet includes permanent magnets, electromagnets, and the like. The term magnet can also refer to internal permanent magnets ("IPMs"), surface mounted permanent magnets ("SPMs"), and the like.

As used herein, the term "motor" generally refers, at least in one embodiment, to an electrodynamic machine that is configured to convert electrical energy into mechanical energy.

As used herein, the term "magnetically permeable" is a descriptive term that generally refers, at least in one embodiment, to those materials having a magnetically definable relationship between flux density ("B") and applied magnetic field ("H"). Further, the term "magnetically permeable" is intended to be a broad term that includes, without limitation, ferromagnetic materials such as common lamination steels, cold-rolled-grain-oriented (CRGO) steels, powder metals, soft magnetic composites ("SMCs"), and the like.

As used herein, the term "pole face" refers, at least in one embodiment, to a surface of a pole shoe that faces at least a portion of the flux interaction region (as well as the air gap), thereby forming one boundary of the flux interaction region (as well as the air gap). In some embodiments, the term "pole face" can be described generally as including a "flux interaction surface." In one embodiment, the term "pole face" can refer to a "stator surface."

As used herein, the term "pole shoe" refers, at least in one embodiment, to that portion of a field pole member that facilitates positioning a pole face so that it confronts a rotor (or a portion thereof), thereby serving to shape the air gap and control its reluctance. The pole shoes of a field pole member are generally located near one or more ends of the core starting at or near a coil region and terminating at the pole face. In some embodiments, the term "pole shoe" can be described generally as a "stator region."

As used herein, the term "soft magnetic composites" ("SMCs") refers, at least in one embodiment, to those materials that are comprised, in part, of insulated magnetic particles, such as insulation-coated ferrous powder metal materials that can be molded to form an element of the stator structure of the present invention.

As used herein, the term "conical magnet structure" refers, in at least one embodiment, to a structure of a conical magnet that can implement magnet material and/or an assembly of magnet components including, but not limited to, magnetic regions and/or magnetic material and a hub structure, or any other magnet having at least one surface being oriented an angle to an axis of rotation. In various embodiments, the term "conical magnet structure" can be used interchangeably with the term "conical magnet." In at least one embodiment, the term "conical magnet" can refer to those magnets described in U.S. Pat. No. 7,061,152, U.S. Nonprovisional application Ser. No. 12/080,788, and/or U.S. Nonprovisional application Ser. No. 11/255,404.

Discussion

Figure 2:
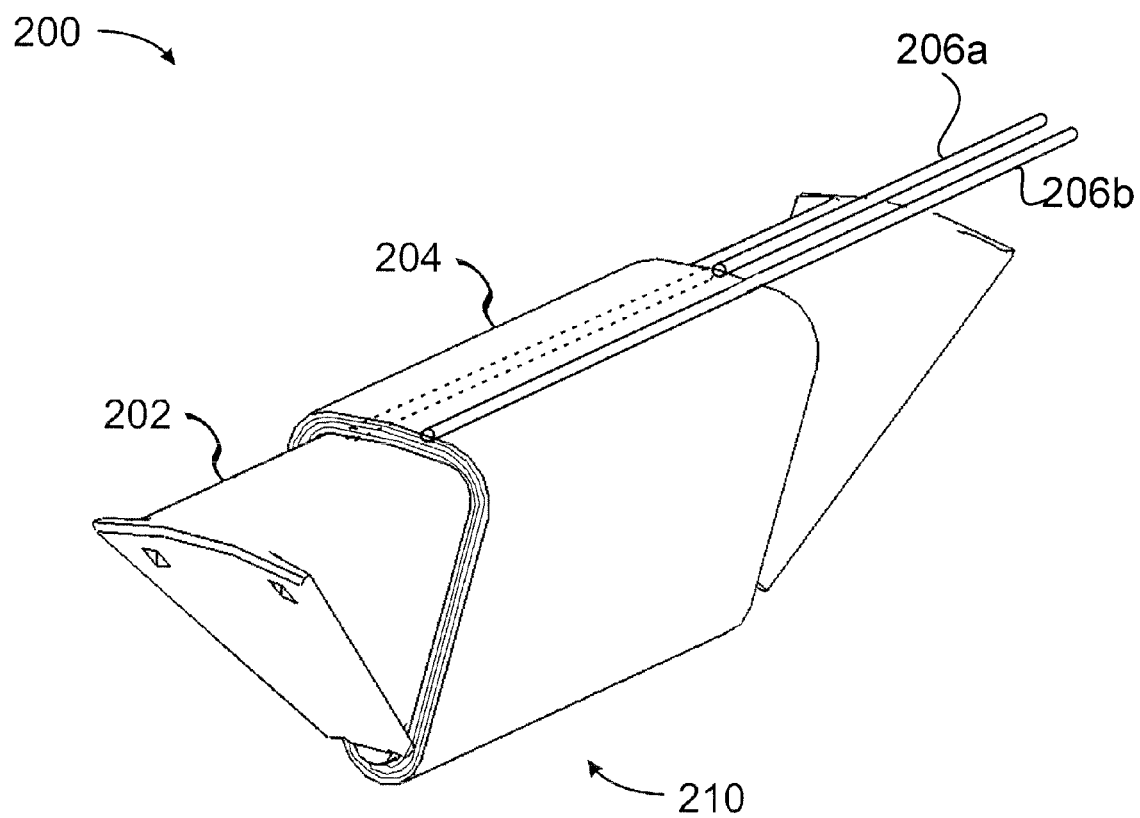

FIGS. 1 and 2 depict examples of active field pole members, according to embodiments of the invention. As shown in FIG. 1, an active field pole member 100 can include a field pole member 102 having a pole face 112 (one of which is not shown) configured to confront a conical magnet (not shown), and a coil structure 110. Coil structure 110 is shown to include a coil 104 composed of one or more wires, and at least a first lead 106a (e.g., a lead into coil 104 as a "lead in" lead) and a second lead 106b (e.g., a lead out of coil 104 as a "lead out" lead). Leads 106a and 106b, in this example, are composed of wire, such as the ends of the wire for coil 104. Leads 106a and 106b can be portions of a monolithic wire, or can be other conductor material formed separately from, and then attached to, one or more wires of coil 104. In various embodiments, one or more coils 104 can include the one or more wires of any type of wire or conductor with cross-sections having any shape. Examples include round wires, square wires, and the like. Field pole members, such as field pole member 102, can be shaped to provide a straight flux path (or a substantially straight flux path) between pole faces 112, according to various embodiments. In at least some embodiments, field pole member 102 is formed to provide a flux path that excludes a non-straight path portion. A non-straight flux path portion can include flux path segments deviating at an angle of about ninety degrees between pole faces 112.

FIG. 2 depicts an example of another active field pole member, according to at least one embodiment of the invention. As shown, an active field pole member 200 can include a field pole member 202 having pole faces to confront conical magnets, and a coil structure 210. Here, coil structure 210 is shown to include a coil 204 composed of one or more foil conductors 204, and at least a first lead 206a (e.g., a lead into coil 204) and a second lead 206b (e.g., a lead out of coil 204). Leads 206a and 206b, in this example, can be composed of wire or any conductor material suitable to facilitate passing a current through coil structure 210 to produce AT flux within field pole member 202. In at least some embodiments, field pole member 202 can be formed to provide any number of coil regions at which one or more coils 204 can be disposed. An example of coil structure 210 is shown next.

Figure 3:
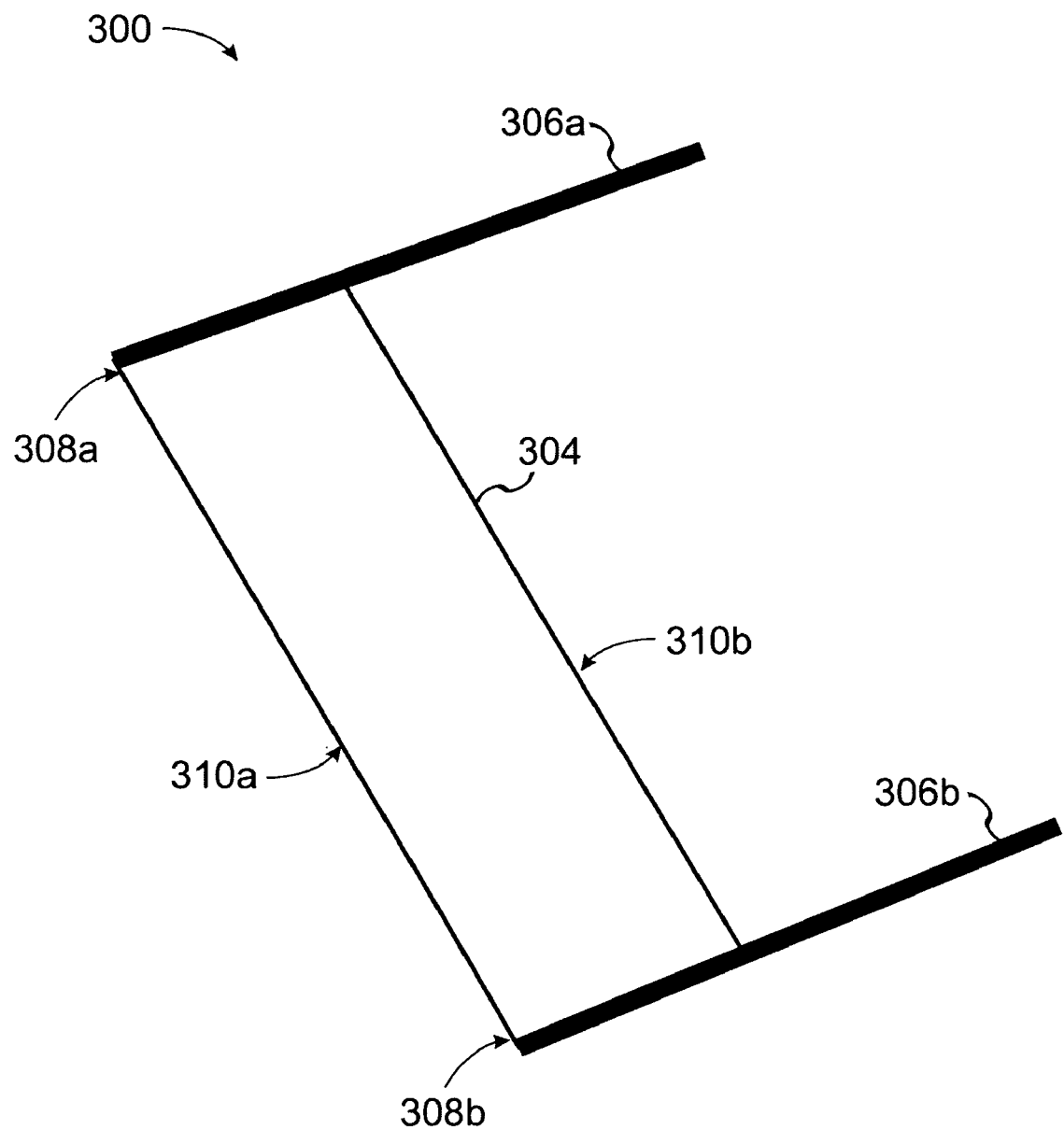
FIG. 3 depicts an example of a coil structure, according to at least one embodiment of the invention.

FIG. 3 depicts an example of a coil structure, according to at least one embodiment of the invention. Coil structure 300 includes a foil conductor 304, which is generally elongated and includes a first lateral side 310a and a second lateral side 310b, both of which extend substantially parallel to a current path established between a first end 308a of foil conductor 304 and a second end 308b of foil conductor 304. Lead 306a and lead 306b are coupled to first end 308a of foil conductor 304 and second end 308b of foil conductor 304, respectively. In one instance, lead 306a and lead 306b are composed of wire. In various embodiments, foil conductors 304 can be composed of copper, aluminum, or any other current-carrying material.

In accordance with various embodiments, one or more foil conductors 304 of coil structure 300 can reduce the impedance of an assembled motor or generator to, for example, to minimize voltage regulation issues (i.e., in generators). Inductance generally increases with the square of the number of turns of the conductor in a winding, so to achieve a lower inductance, fewer turns of a heavier gauge wire are typically implemented. The size and spacing of the field pole members relative to each other are limited by the gauge of the wire used due to, for example, the minimum bend radius of the wire. By contrast, relatively thin, but wide pieces of foil conductor 304 can have the conductor cross-sectional area equivalent to a relatively heavy gauge wire, but can be easily wrapped around a straight field pole member (or a substantially straight field pole member). Note that in the example shown, lead 306a and lead 306b composed of wires can facilitate the implementation of foil conductor 304. In other embodiments, lead 306a and lead 306b can be composed of other conductors, including foil conductors (e.g., such as the case when foil conductor 304 includes aluminum).

Figure 4A:
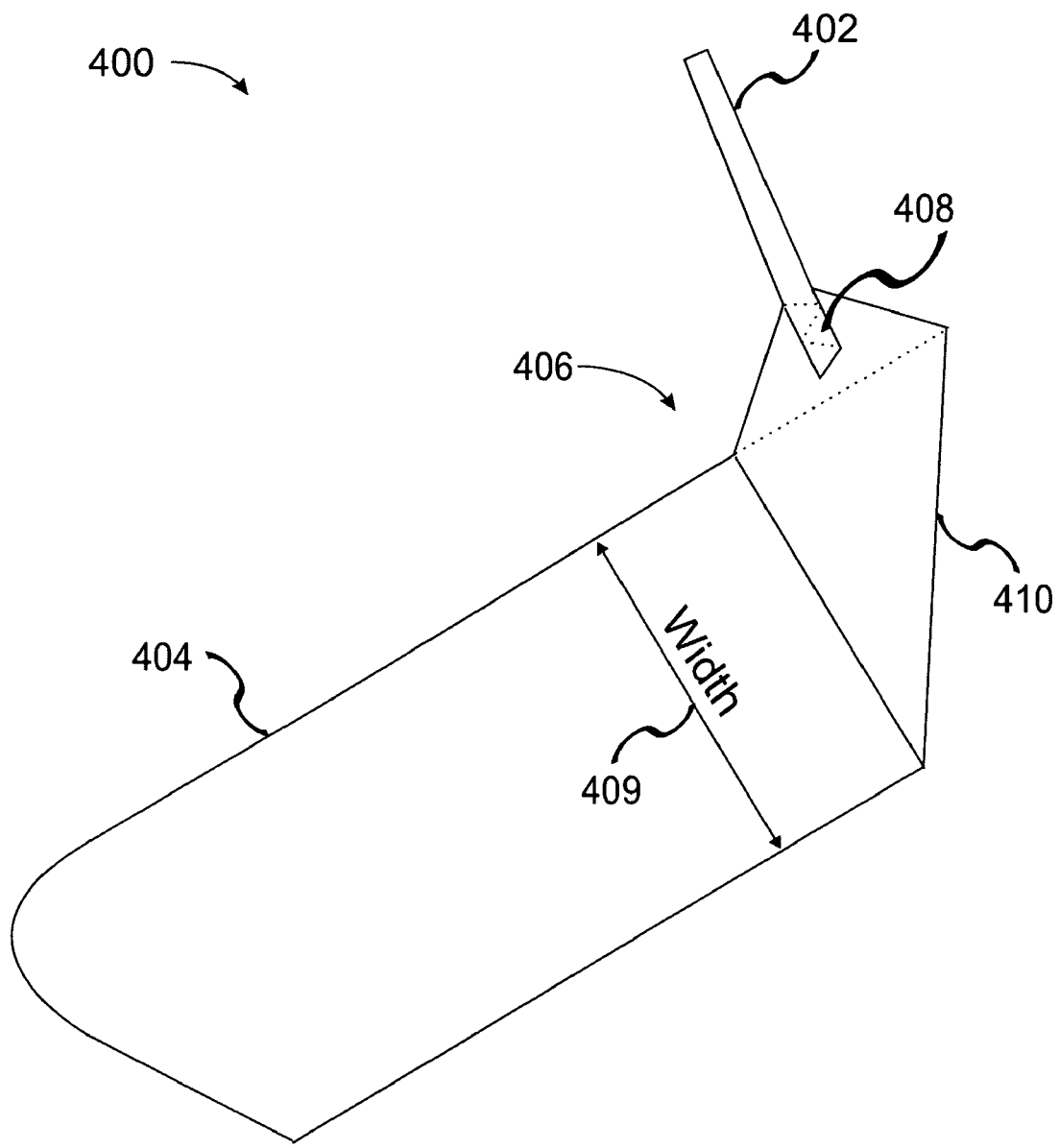
FIG. 4A depicts a portion of a coil structure including a foil-based lead, according to a specific embodiment of the invention.

FIG. 4A depicts a portion of a coil structure including a foil-based lead, according to a specific embodiment of the invention. Coil structure portion 400 includes a portion of a foil conductor 404 with a foil-based lead 402 formed at an end 406 of foil conductor 404. Foil-based lead 402 can be formed from foil conductor 404 or any other foil conductor (not shown). In one embodiment, foil-based lead 402 includes a current density enhancement portion 408 that is configured to provide, for example, a cross-sectional area for foil-based lead 402 that is equivalent to, or substantially approximates, a cross-sectional area at the width ("width") 409 of foil conductor 404. For instance, current density enhancement portion 408 can be configured to enhance the coupling between foil-based lead 402 and foil conductor 404 to enhance the current density that otherwise might be hindered. In at least some embodiments, foil-based lead 402 is formed from the same foil conductor as is portion of foil conductor 404 (e.g., foil-based lead 402 and portion of foil conductor 404 are formed from the same monolithic conductor). Thus, reliability of the structure can be enhanced over structures in which a lead is attached using any known fastener (e.g., solder, etc.) to a portion of a foil conductor 404. Current density enhancement portion 408 can be configured to match the current-carrying capacity of foil-based lead 402 to that of foil conductor 404. Optionally, foil-based lead 402 can be oriented at any angle to foil conductor 404 by folding foil conductor 404 at fold line 410. In accordance with various embodiments, one or more fold lines (not shown) can be implemented with, or as a replacement of, fold line 410 to determine an angle between foil-based lead 402. While foil-based lead 402 can be formed from the same foil conductor, it need not be in accordance with some embodiments. In various embodiments, one or more sides of foil conductor 404 can include an insulation layer placed up on the one or more sides. Note that such an insulation layer (or portions thereof) can be removed to enhance electrical conductivity between portions folded upon each other.

Figure 4B:
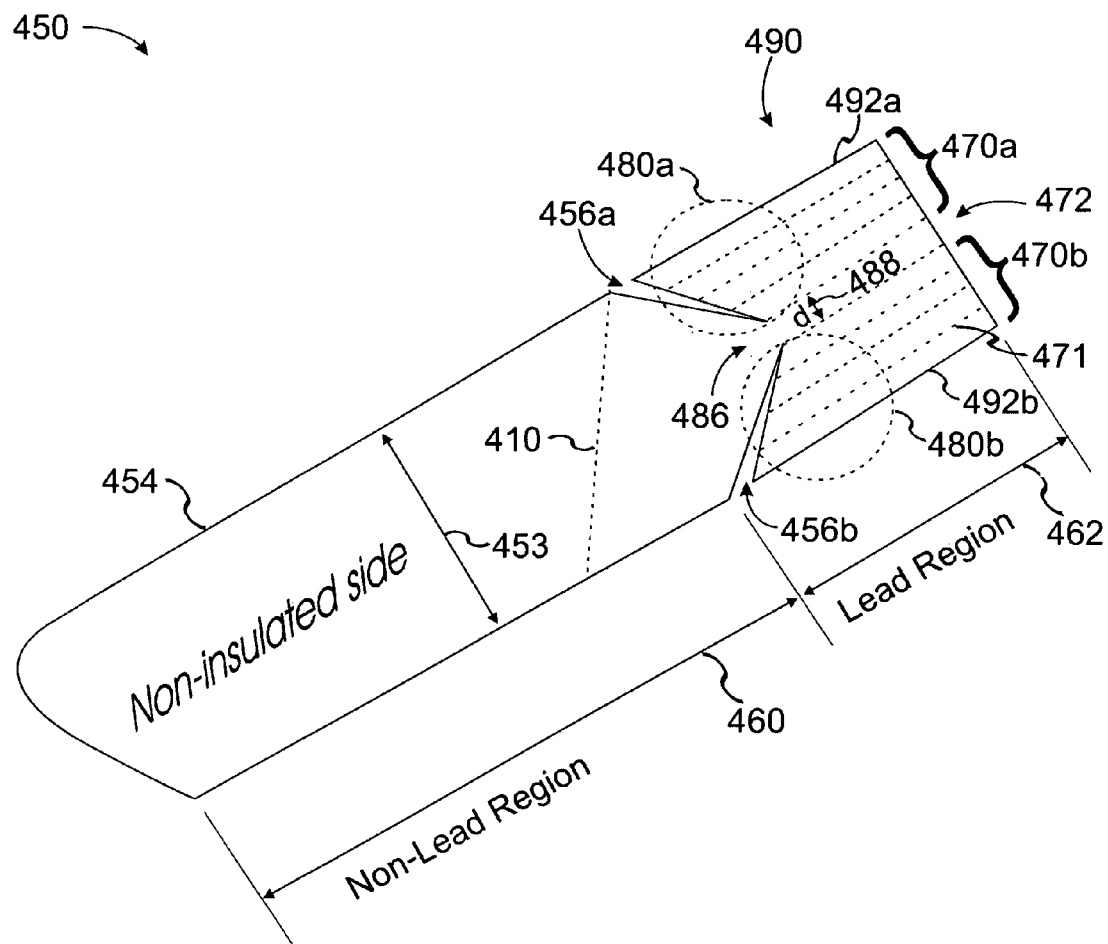
FIG. 4B shows a foil-based lead structure, according to an embodiment of the invention.

FIG. 4B shows a foil-based lead structure, according to an embodiment of the invention. Coil structure portion 450 includes a portion of a foil conductor 454 having a foil-based lead structure 490 formed at an end of foil conductor 454. Foil-based lead structure 490 can be configured to include folded portions 470a and 470b that are configured to fold upon each other. Folded portions 470a and 470b can include current density enhancement portions 480a and 480b, respectively, which can be configured to provide for a cross-sectional area for foil-based lead structure 490 that can be equivalent to a cross-sectional area at or along the width 453 of foil conductor 454. In one embodiment, foil conductor 454 can include a non-lead region 460 and a lead region 462, which includes folded portions 470a and 470b. Note that a one-sided insulation layer can be sufficient to electrically isolate the foil conductor as it is wound upon itself on a field pole member, according to at least some embodiments.

In a specific embodiment, one or more diagonal slits, such as diagonal slits 456a and 456b, can be cut into foil conductor 454 at or near the boundary between non-lead region 460 and lead region 462. In one instance, diagonal slits 456a and 456b can be cut at acute angles to lateral sides 492a and 492b, where the acute angles open, for example, toward folded portions 470a and 470b. Note that the distance ("d") 488 between diagonal slits 456a and 456b can determine the width of seed lead portion 472, which, in turn, can determine the width of the lead for foil-based lead structure 490 after folded portions 470a and 470b are folded onto seed lead portion 472 (e.g., folded longitudinally along lines 471). Seed lead portion 472 can be configured to be formed from the same monolithic material as foil conductor 454, and can provide a foundation upon which folded portions 470a and 470b are folded. In some embodiments, folded portions 470a and 470b are Z-folded (i.e., mimicking the letter "Z") on seed lead portion 472. Note that if foil conductor 454 has an insulation layer on one or both sides, the insulation layer can be removed from fold line 410 to the end of foil conductor 454. After folding folded portions 470a and 470b, current density enhancement portions 480a and 480b each can be affixed (e.g., with conductive glue, solder, or any other electrically adhesive or fastener) to foil conductor 454 at or near region 486 to enhance the current density that the foil can conduct in that area. The portion of foil conductor 454 that includes foil-based lead structure 490 can then be folded along fold line 410 to create a lead that is, for example, substantially perpendicular to the foil. In other examples, fold line 410 can be configured to locate the lead at any angle to foil conductor 454. Note that in one embodiment, seed lead portion 472 can be located near a lateral side of foil conductor 454, thereby using one diagonal slit, such as diagonal slit 456a, to form the lead.

Figure 5:
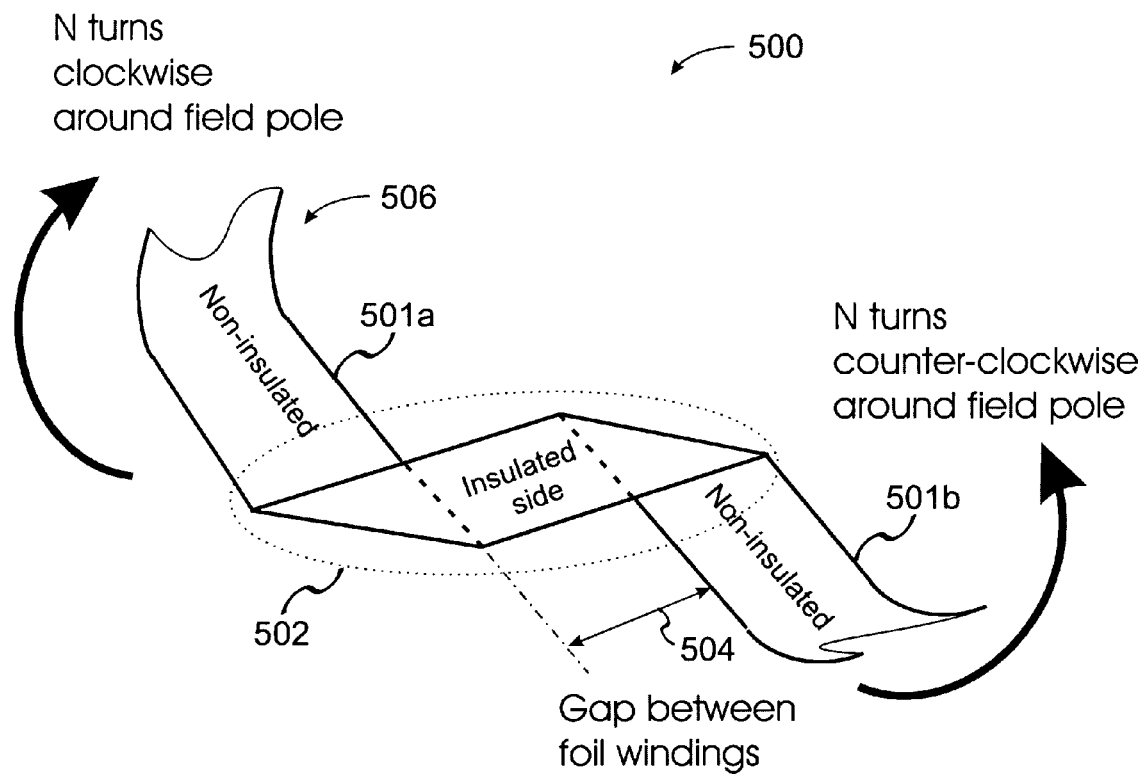
FIG. 5 depicts a portion of a coil structure including an offset portion, according to a specific embodiment of the invention.

FIG. 5 depicts a portion of a coil structure including an offset portion, according to a specific embodiment of the invention. Coil structure portion 500 includes an offset portion 502 formed in a foil conductor 506. Offset portion 502 is configured to form multiple foil conductor portions 501a and 501b and to form a gap 504 therebetween. As such, multiple foil conductor portions 501a and 501b can be wound about different regions (not shown) of a field pole member. In at least some embodiments, a foil conductor portion, such as either of foil conductor portions 501a and 501b, can be configured to be disposed at or near a corresponding coil region on a field pole member. So, if 2N number of turns is desired, each of multiple foil conductor portions 502a and 502b can include N number of turns, which can reduce the thickness of the coil structure wound about a field pole member. Reducing the thickness of the coil structure can enhance the packing density of a motor or generator implementing foil conductors of the various embodiments. Note that each of foil conductor portions 501a and 501b can have any number of turns, and need not be limited to the same number of turns, and can be wound in, for example, opposite directions (e.g., clockwise and counter-clockwise), relative to offset portion 502. That is, foil conductor portion 501a can be wound clockwise about a field pole member relative to offset portion 502, whereas foil conductor portion 501b can be wound counter-clockwise about the field pole member relative to offset portion 502. Thus, when a current passes through foil conductor portions 501a and 501b, the current flows in the same direction in each of foil conductor portions 501a and 501b, thereby inducing magnetic flux (i.e., ampere-turn ("AT") flux) in the field pole member in the same direction. The leads from both coil regions can be located on their respective outside layers, thereby making the leads accessible. While the coils could be also be wound in the same direction (e.g., both clockwise or counter clockwise) relative to offset portion 502, this can result in the induced magnetic flux from each coil being in opposite directions, thereby tending to cancel each other's magnet flux contribution, if the number of turns wound on each coil is the same. In the example shown, offset portion 502 can be formed from a foil conductor that is monolithic, such that foil conductor portion 501a is formed from the same indivisible material with foil conductor portion 501b (e.g., foil conductor portion 501a is not formed from separate parts than is foil conductor portion 501b). As used to describe some examples, a contiguous conductor can be formed as a monolithic conductor. In at least some embodiments, offset portion 502 can be formed from other conductive material and coupled to foil conductor portions 501a and 501b.

Figure 6:
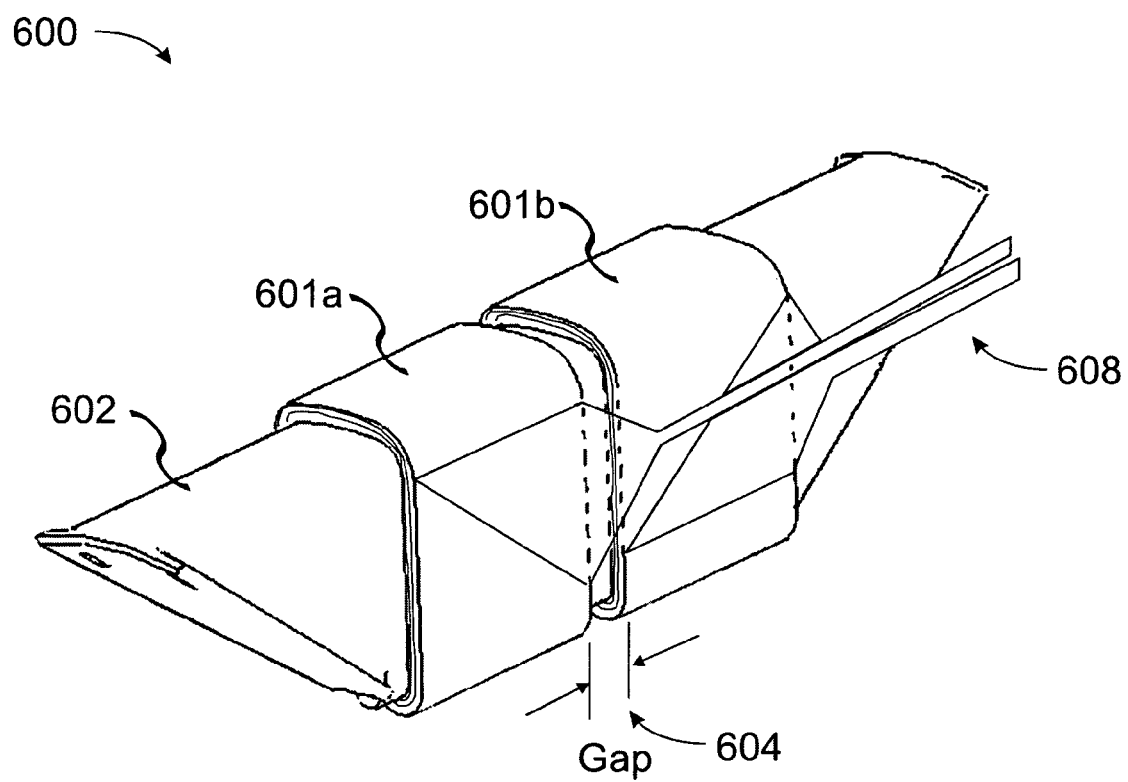
FIG. 6 illustrates an active field pole member implementing multiple foil conductor portions, according to an embodiment of the invention.

FIG. 6 illustrates an active field pole member implementing multiple foil conductor portions, according to an embodiment of the invention. Active field pole member 600 includes multiple foil conductor portions 601a and 601b offset by a gap 604, which is configured to preclude (or minimize) voltage differentials from arcing between multiple foil conductor portions 601a and 601b. One of multiple foil conductor portions 601a and 601b can be wound in a clockwise direction, while the other can be wound in a counter-clockwise direction. Or, both can be wound in the same direction. While multiple foil conductor portions 601a and 601b can be produced from separate foil conductors, they also can be produced from a single foil conductor implementing an offset portion 502 (FIG. 5), which is not shown in FIG. 6. Note that offset portion 502 can be configured to provide a current path to pass through multiple foil conductor portions 601a and 601b in the same direction, thus creating additive magnetic flux in field pole member 602, which will be polarized in the same direction. Further, foil-based leads 608 can optionally be implemented. As shown here, two leads 608 are implemented for a configuration in which foil conductor portions 601a and 601b are coupled together. In other instances, when foil conductor portions 601a and 601b are not coupled together, two other leads (not shown) can be implemented to pass current through each conductor portion. Note that in some embodiments, aluminum (or other like current-carrying material) can be used in multiple foil conductor portions 601a and 601b, and oxidization of the aluminum on the top and bottom of the foil may provide sufficient insulation, thereby reducing a need to include insulation (e.g., a plastic insulation layer) and related thickness, or any other insulation material between each winding for each of multiple foil conductor portions 601a and 601b.

Generally, motors and generators according to the various embodiments can have multiple field pole members per phase that are, for example, connected in series with the lead-outs (or commons) connected together to form a "Y" connection topology. When using foil conductors, the number of connections among different field pole members can be reduced by using a continuous conductor (e.g., a monolithic strip of a foil conductor) to couple multiple field pole members in a phase. FIGS. 7 through 14 show several examples that are representative of the many schemes for making these continuous foil configurations, according to various embodiments.

Figure 7:
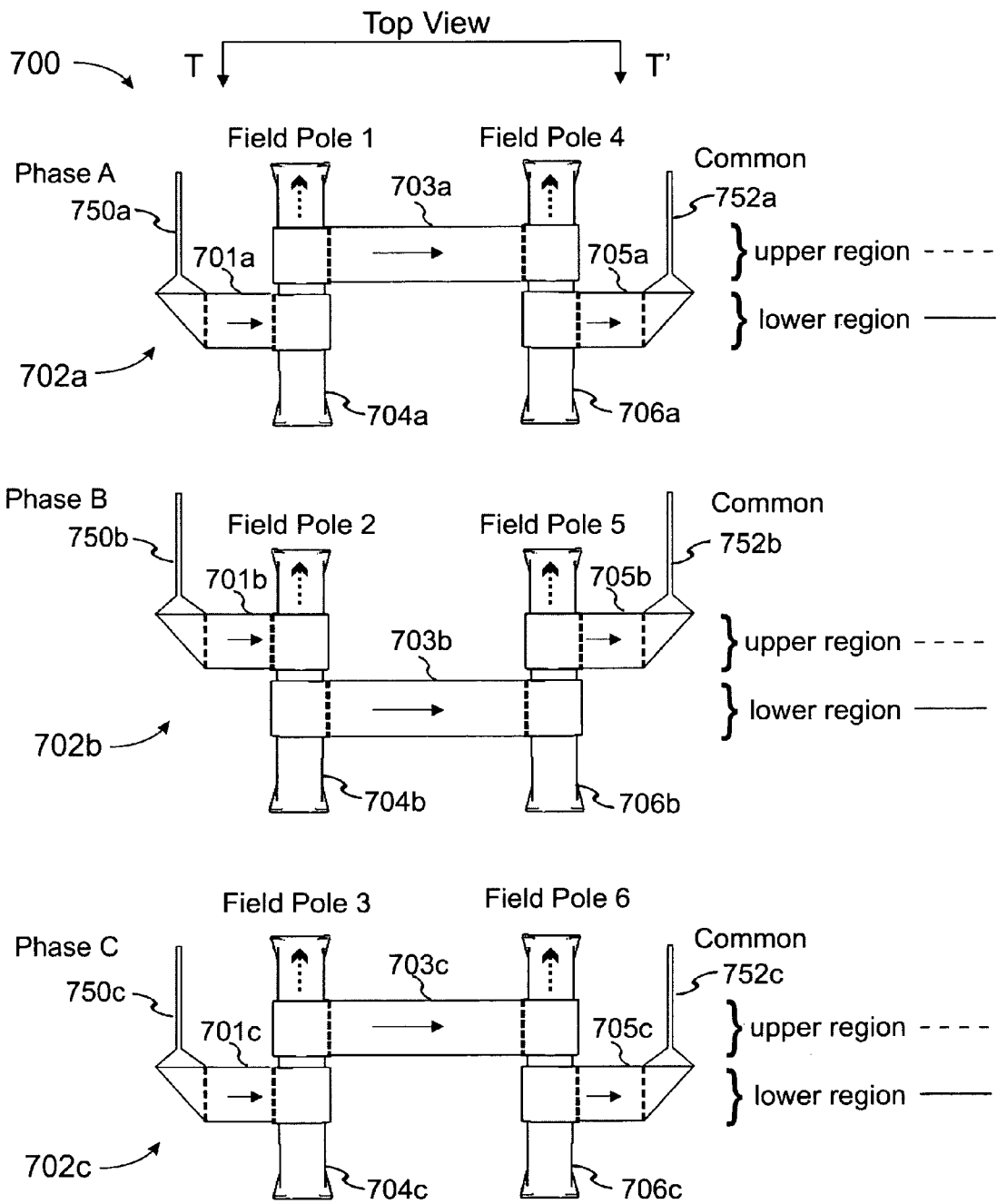
FIG. 7 is a diagram depicting portions of a stator implementing active field pole members that are coupled together, according to one embodiment of the invention.

FIG. 7 is a diagram depicting portions of a stator implementing active field pole members that are coupled together, according to one embodiment of the invention. In this example, six field pole members are implemented in the stator and four magnet poles are implemented on conical magnets (e.g., conical magnet structures having four magnetization regions). As shown, a first subset 702a of the field pole members includes field pole members 704a and 706a being coupled via a first foil conductor, first subset 702a including at least two field pole members being coupled by first foil conductor portion 703a at a first region, such as the upper regions associated with field pole members 704a and 706a. The first foil conductor includes first foil conductor portion 703a wound (e.g., in the same counter-clockwise direction when viewed from the top, i.e., top view T-T') at the first regions. The first foil conductor also includes first foil conductor portion 701a, which includes a lead-in (e.g., lead 750a for applying a phase A current to energize first subset 702a), and first foil conductor portion 705a, which includes a lead-out (e.g., lead 752a for coupling to common). Note that the dashed arrows in field pole members 704a and 706a indicate the direction of magnetic flux when a current is applied in the conductor for phase A, in the direction shown by the arrows in foil portions 701a, 703a and 705a. Note, too, that the foil conductor is shown to be wound about the two field pole members in the same direction. Further, upper regions (or first regions) are shown in association with dashed lines in subsequent figures, and lower regions (or second regions) are shown in association with solid lines. These conventions can apply to subsequent figures as well.

Further, a second subset 702b of field pole members 704b and 706b are shown to be coupled via a second foil conductor, second subset 702b including at least two field pole members, such as field pole members 704b and 706b, that are coupled by a second foil conductor portion 703b at a second region, such as the lower regions associated with field pole members 704b and 706b. The second foil conductor can include second foil conductor portion 703b wound (e.g., in the same direction, such as counter-clockwise) at the second regions. The second foil conductor can also include second foil conductor portion 701b, which includes a lead-in (e.g., lead 750b for applying a phase B current to energize second subset 702b), and second foil conductor portion 705b, which includes a lead-out (e.g., lead 752b for coupling to common). In this example, portions 701b and 705b are associated with the first region. Further to the example shown in FIG. 7, a third subset 702c is implemented, with connection between field pole members 704c and 706c being similar to that of first subset 702a, but in relation with a phase C voltage. The third foil conductor can include third foil conductor portion 703c wound (e.g., in the same counter-clockwise direction) at the second region. The third foil conductor can also include third foil conductor portion 701c, which includes a lead-in (e.g., lead 750c for applying a phase C current to energize second subset 702c), and third foil conductor portion 705c, which includes a lead-out (e.g., lead 752c for coupling to common).

Note that FIG. 7 indicates that the field pole members implement an offset portion (not shown) similar to that shown in FIGS. 5 and 6, and that the "lead-out" leads of field pole members 704a, 704b, and 704c continue out and transform into the "lead-in" leads for field pole members 706a, 706b, and 706c, respectively. Specifically, the conductors of foil conductor portions 703a, 703b, and 703c are configured to replace "lead-out" leads and "lead-in" leads between the field pole members to, among other things, enhance reliability. Foil conductor portions 703a, 703b, and 703c can enhance the reliability of the structure by reducing connections between non-monolithic materials, such as using wires to couple portions 701b and 705b together. Further, conductors of foil conductor portions 703a, 703b, and 703c can be configured to provide any length between field pole members 704a, 704b, and 704c, and respective field pole members 706a, 706b, and 706c to assemble subsets 702a, 702b, and 702c to form a stator according to at least some embodiments of the invention. Namely, such lengths can be configured to ensure a number of turns at specific coil regions, such as the upper and lower regions. According to various embodiments, two or more of the lengths of the foil conductor portions 703a, 703b, and 703c can be configured to be different, each length being determined as a function of the interlacing patterns (e.g., the patterns of weaving foil conductors among each other, examples of which are shown and described in FIG. 8A).

In various embodiments, there can be any number of coil regions (e.g., more than 2 regions that may or may not include the upper and lower regions, with separate leads for each coil or coil pair), and any number of field pole members per subset of field pole members. In at least some embodiments, there can be any number of subsets of field pole members. Further, there can be any number of conductors that can be used to couple field pole members of a subset of field pole members. Note that while FIG. 7 shows 6 field pole members for 4 magnet poles, the various embodiments can include any number of field pole members, any number of subsets, and/or any number of magnet poles.

Figure 8A:
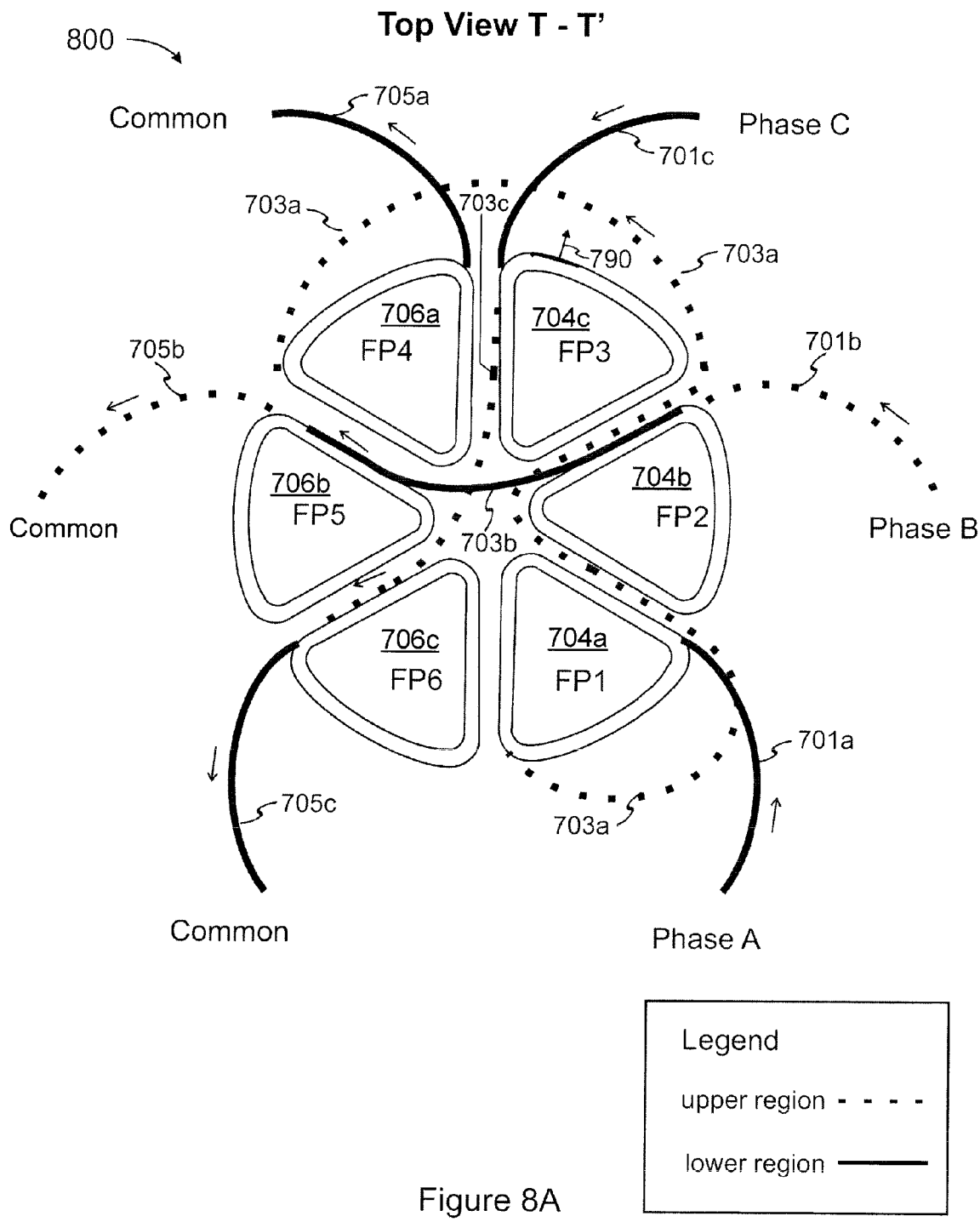
FIG. 8A is a top view of a stator assembled with subsets of field pole members shown in FIG. 7, according to an embodiment of the invention.

FIG. 8A is a top view 800 of a stator assembled with subsets of field pole members shown in FIG. 7, according to an embodiment of the invention. Note that the subsets of field pole members can be separately wrapped as shown in FIG. 7 using multiple regions at which to wrap foil conductors. Then, the assembled subsets of field pole members can be combined or integrated together to form a stator, such as the example shown in FIG. 8A. For purposes of distinguishing foil conductors associated with different regions, with reference to top view T-T', a solid line is used to indicate portions of a foil conductor that are wrapped in association with the lower regions, while a dotted line is used to indicate the upper regions. Note, too, that no foil conductor portion wrapped at the lower regions has to cross, or interfere with, another foil conductor portion wrapped at the same lower region. Nor does any foil conductor portion in the upper regions cross, or interfere with, another foil conductor portion in the upper region. In particular, field pole members 704a ("FP1") and 706a ("FP4") constituting subset 702a are located opposite to each other across the center of the stator, the center being an interior region configured to include a shaft (not shown). Other field pole members in other pairs of subsets 702b and 702c are similarly positioned. Thus, conductors that couple the pairs of field pole members together via the center of the stator at the same coil region locations will not interfere with each other, according to various embodiments of the invention. FIG. 8A also shows the directions (e.g., clockwise or counter-clockwise winding of foil conductors as viewed in top view T-T').

According to various embodiments, the implementation of offset portions (not shown) in the foil conductors of subsets 702a, 702b, and 702c can facilitate the use of multiple coil regions (e.g., the upper and lower regions of FIG. 7), which can reduce or eliminate instances in which foil conductors interfere with each other when coupling the pairs of field pole members. In at least some embodiments, the lengths of foil conductor portions 703a, 703b, and 703c can be configured to be the same or different. Different lengths can assist in the reduction or elimination of instances in which one of foil conductor portions 703a, 703b, and 703c might prevent or hinder another from coupling relevant field pole members together. In various embodiments, any of foil conductor portions 703a, 703b, and 703c can be configured to do one or more of the following: (1) pass through the center of the stator, such as foil conductor portion 703b of FIG. 8A; (2) pass through an external boundary region of the stator (e.g., a region 790 outside the surfaces of the field pole members, the surfaces generally located farthest from the center of the stator), such as foil conductor portion 703a (i.e., it exits the center of the stator between field pole members ("FP2") 704b and ("FP3") 704c and passes through the external boundary region to pass over the outside the surfaces of the field pole members ("FP3") 704c and ("FP4") 706a to couple to field pole member ("FP4") 706a in, for example, a counter-clockwise direction (as viewed in the top view T-T); (3) enter and/or exit the center of the stator (e.g., without passing through the center of the stator), such as foil conductor portion 703a (e.g., portion 703a weaves from the external boundary region adjacent field pole member ("FP1") 704a into an interface between field poles field pole members ("FP1") 704a and ("FP2") 704b to enter the center of the stator, and exits between field pole member ("FP2") 704b and field pole member ("FP3") 704c to extend back into the external boundary region); and/or (4) provide any other configuration in which to couple two or more field pole members together. Any or all portions of foil conductors can be configured to provide for any or all of the aforementioned configurations.

Any of foil conductor portions 703a, 703b, and 703c can have the same or varying lengths relative to one or more of the others for assembly into a stator. In the example shown, the length of foil conductor portion 703a (e.g., about 55 "dashed lines" between field pole members, a dashed line approximating a unit of length) is shown to be greater than foil conductor portion 703c (e.g., about 14 "dashed lines" between field pole members as it passes through the center of the stator). This configuration results in the following connection scheme: all three commons can be connected or coupled together, internally or externally, and phases A, B and C can be available to be connected to an external drive to complete a standard "Y" motor wiring configuration.

Figure 8B:
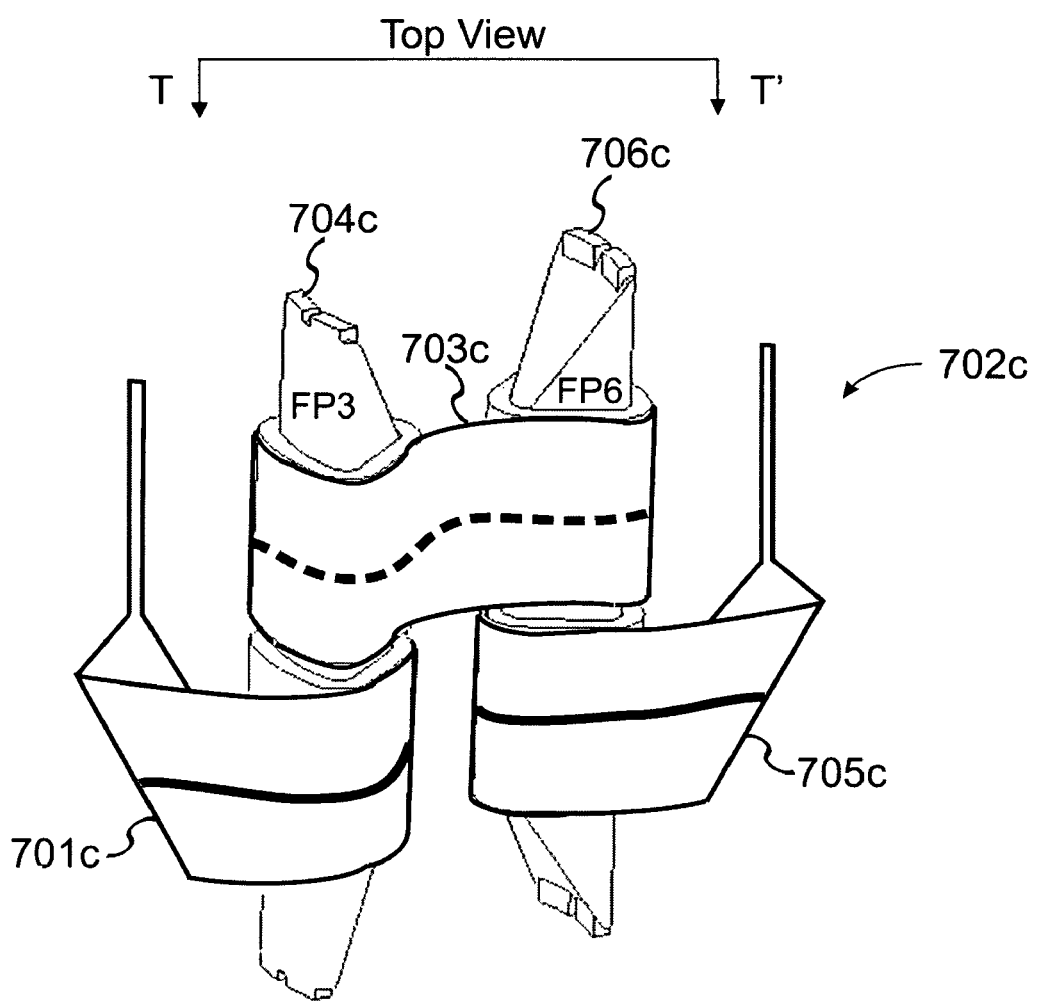
FIGS. 8B to 8D indicate an example of the assembly of a stator, according to one embodiment of the invention.
Figure 8C:
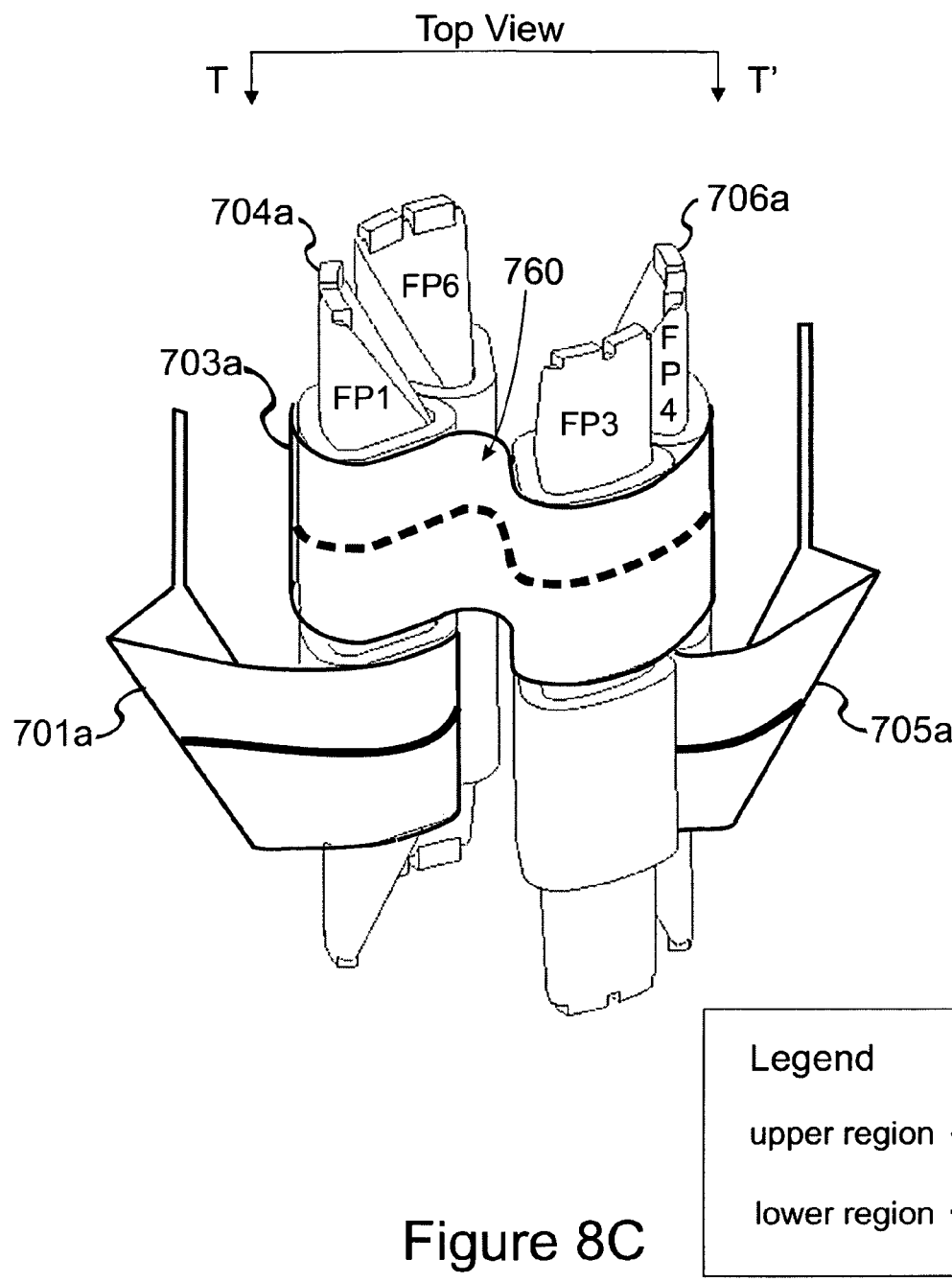
Figure 8D:
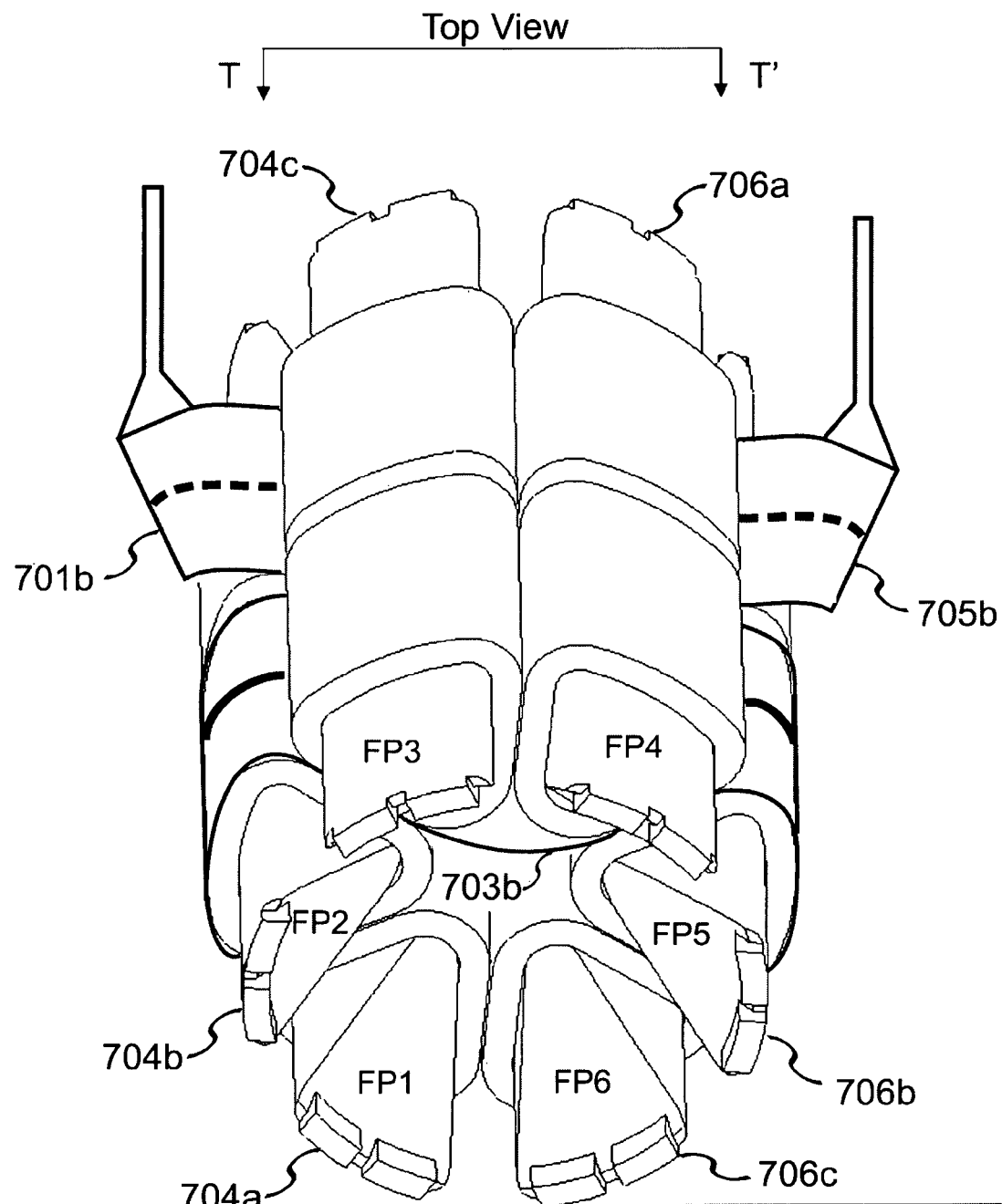

FIGS. 8B to 8C indicate an example of the assembly of a stator, according to an embodiment of the invention. FIG. 8B depicts the assembly of subset 702c of FIG. 7, with FIG. 8C showing the integration of subset 702a with subset 702c. As shown, foil conductor portion 703c has a part 760 that is adapted to pass between field pole member ("FP2") 704b, which is added in FIG. 8D, and the center of the stator. FIG. 8D includes the addition of subset 702b to form a stator. In some cases, field pole members ("FP2") 704b and ("FP5") 706b of subset 702b are inserted from the bottom of the stator assembly shown in FIG. 8C to form a stator. Note that in FIGS. 8B to 8C, the leads relevant to the stage of assembly are shown with others being omitted for simplicity of discussion.

Figure 9:
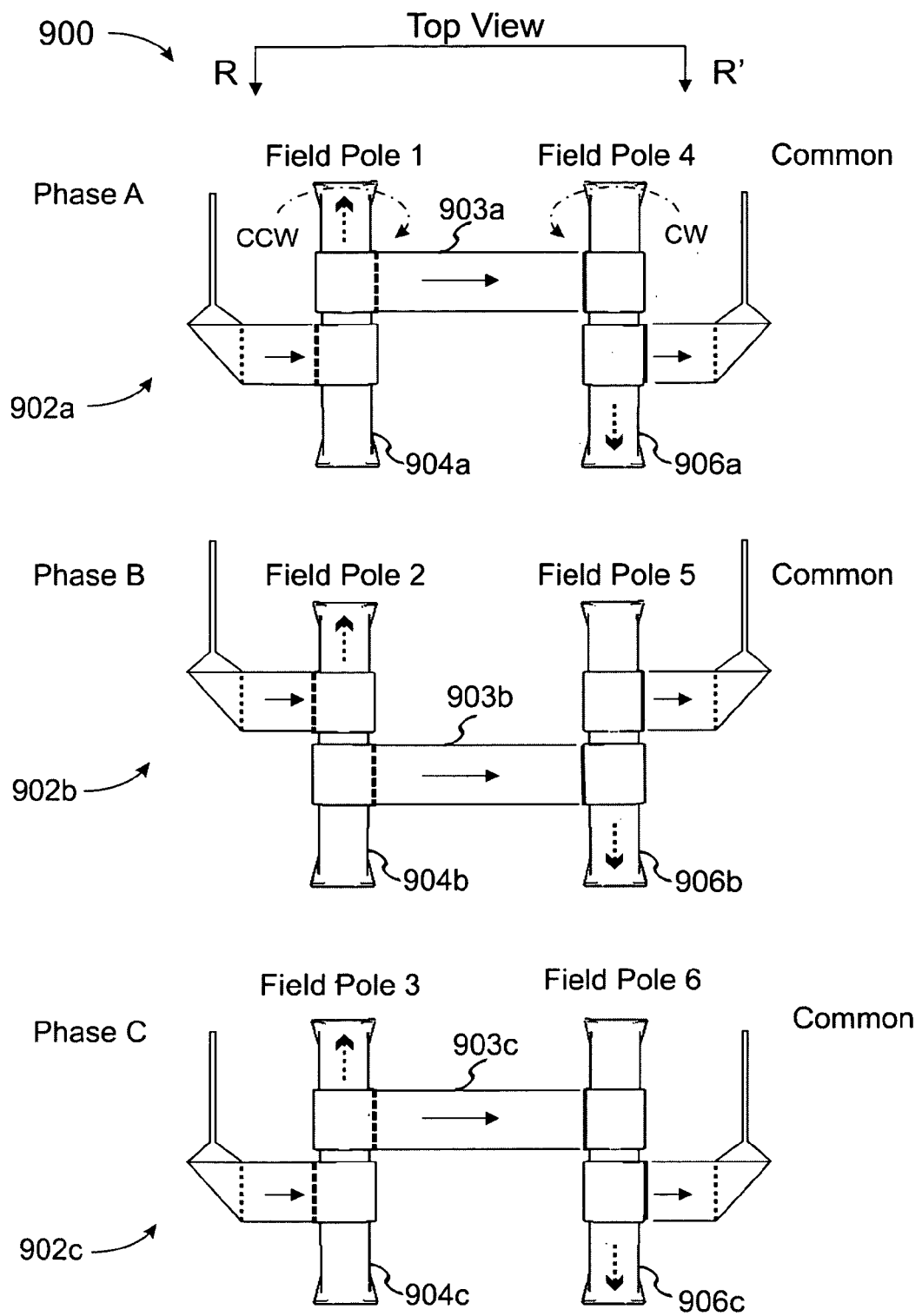
FIGS. 9, 10A and 10B show another foil configuration for a stator, according to an embodiment of the invention.
Figure 10A:
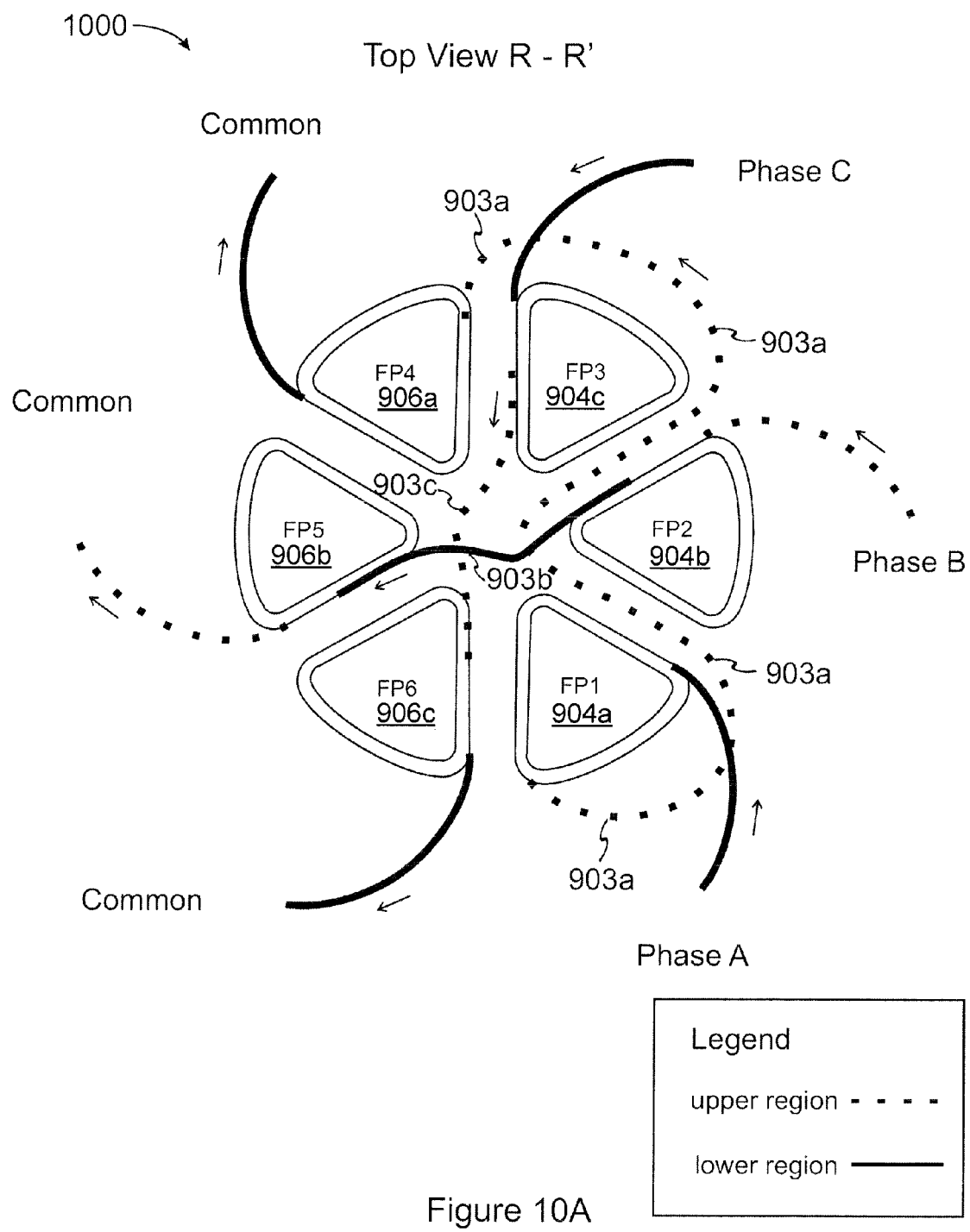
Figure 10B:
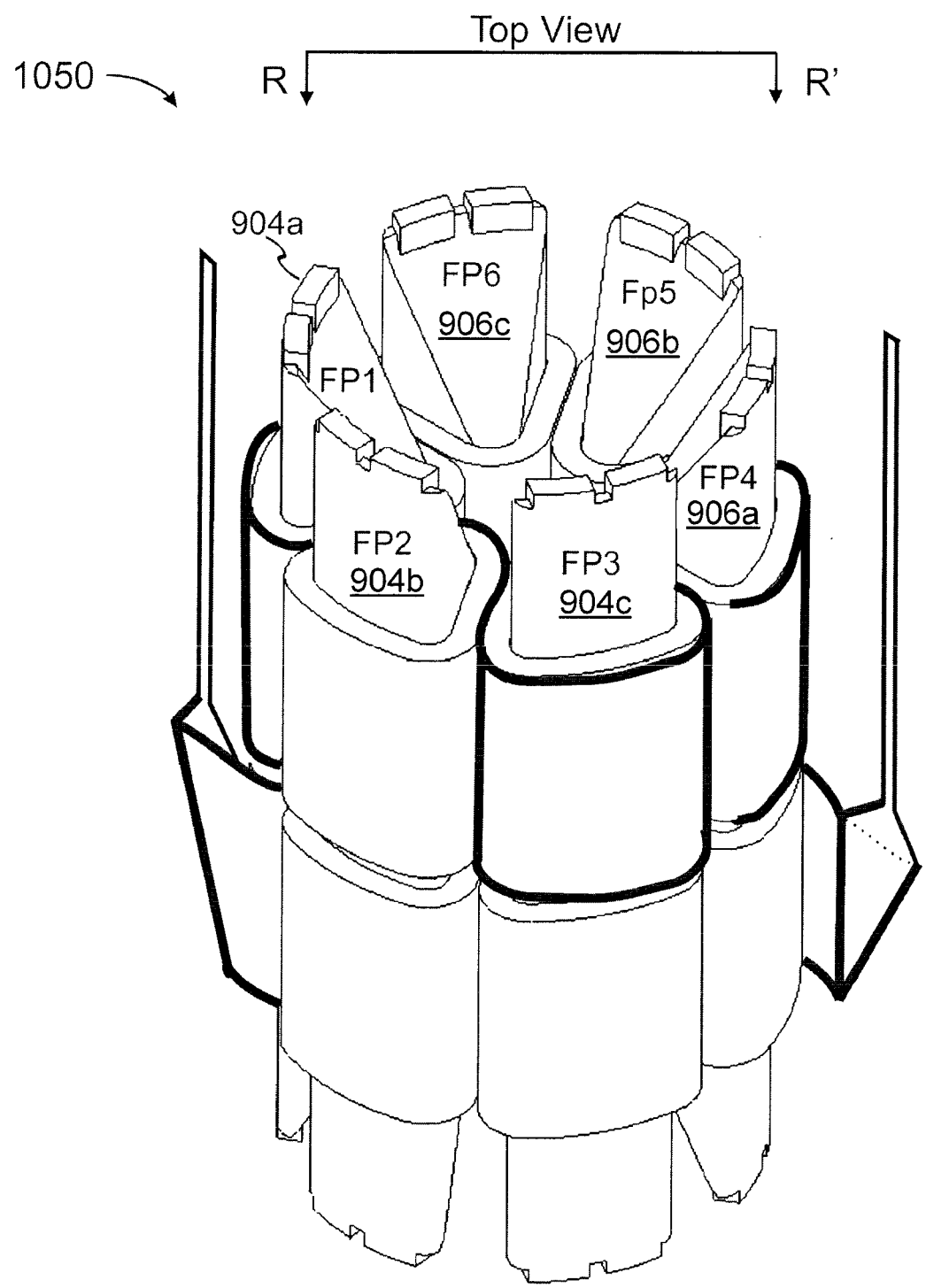

FIGS. 9, 10A and 10B show another foil configuration for a stator, according to an embodiment of the invention. Here, the foil configurations implement a motor with six field poles and two magnet poles. Note that this differs from the example in FIGS. 7 to 8D because the directions of the magnetic flux in field pole members 906a, 906b, and 906c are oriented in the opposite directions to field pole members 904a, 904b, and 904c, respectively, of subsets 902a, 902b, and 902c. For example, a first set of ends of foil conductor portions 903a, 903b, and 903c can be wound on field pole members 906a, 906b, and 906c in a clockwise direction ("CW") as viewed from top view R-R', whereas as second set of ends of foil conductor portions 903a, 903b, and 903c can be wound on field pole members 904a, 904b, and 904c can be wound in a counter-clockwise direction ("CCW"). Note, too, that the foil conductor is shown to be wound about the two field pole members in opposite directions. FIG. 10A shows an end view 1000 of a stator assembled with subsets 902a, 902b, and 902c with the two levels of foil. Foil conductors wrapped at a lower region are shown in solid, while foil conductors at the upper region are shown as dotted/dashed lines. Note, again, that foils on the same level or in the same region do not cross or interfere with each other. FIG. 10B is a perspective view 1050 of the stator assembled in association with the subsets 902 of FIG. 9, with the addition of a conical magnet rotor structure shown.

Figure 10C:
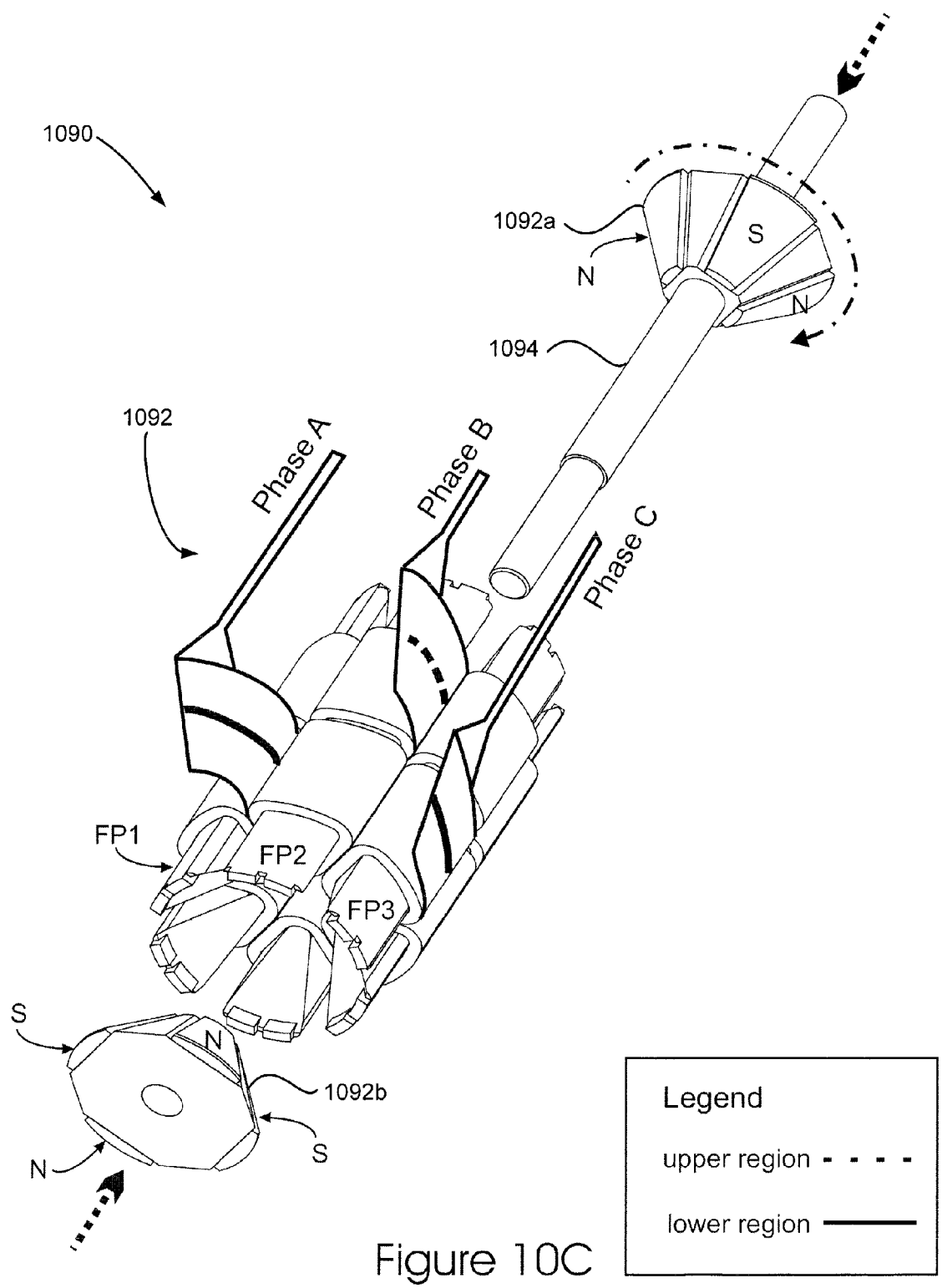
FIG. 10C shows an example of a rotor-stator structure including various coil structures and stators, according to various embodiments of the invention.

FIG. 10C shows an example of a rotor-stator structure including various coil structures and stators, according to various embodiments of the invention. FIG. 10C depicts a rotor-stator structure 1090 including a rotor composed of a shaft 1094 and magnets (e.g., conical magnets 1092a and 1092b), and a stator 1092. In the example shown, stator 1092 is similar in structure and/or function as the stator shown in view 1050 of FIG. 10B. In at least some embodiments, stator 1092 can include any number of field pole members, any number of coil structures, and any type of winding patterns for coupling the sets of fields pole members together for each phase, such as phases A, B, and C.

Figure 11:
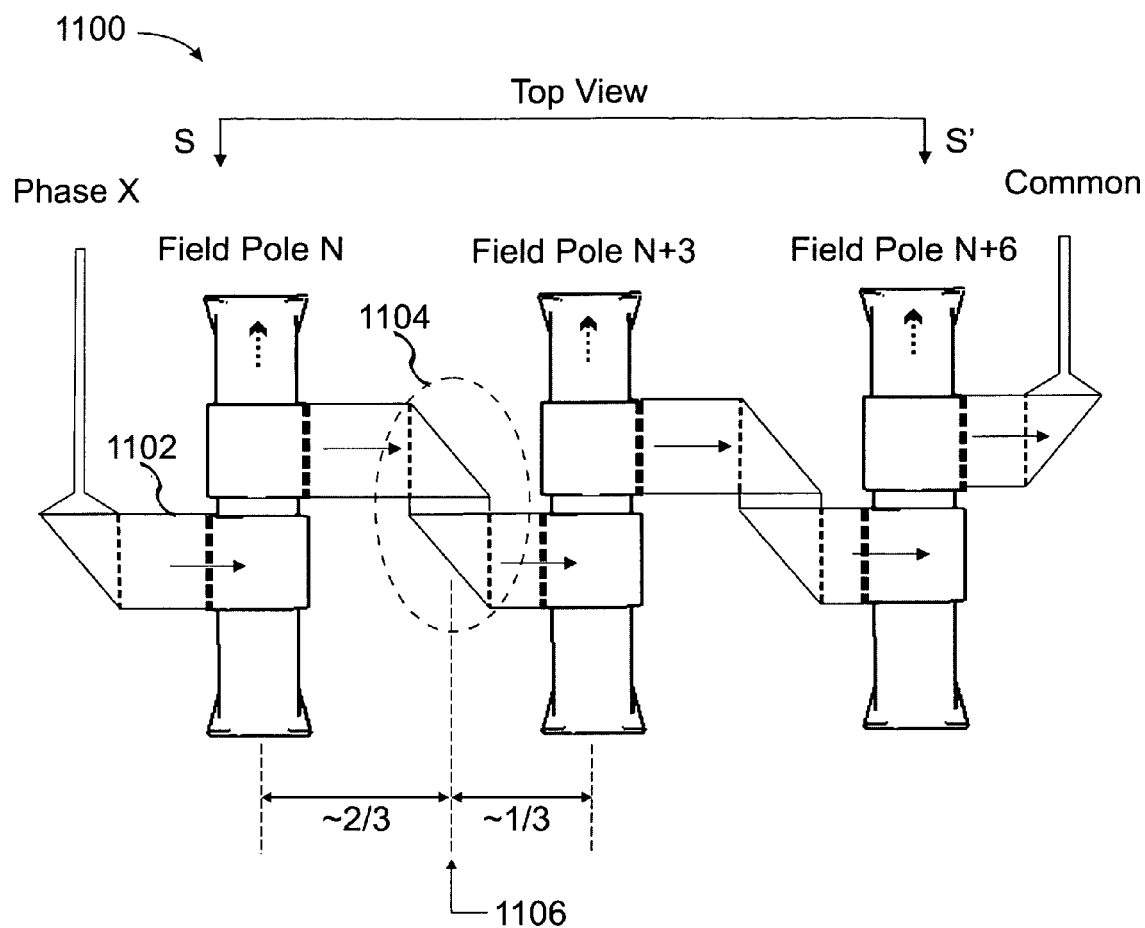
FIGS. 11 and 12 show yet another example of a foil configuration for a stator, according to an embodiment of the invention.
Figure 12:
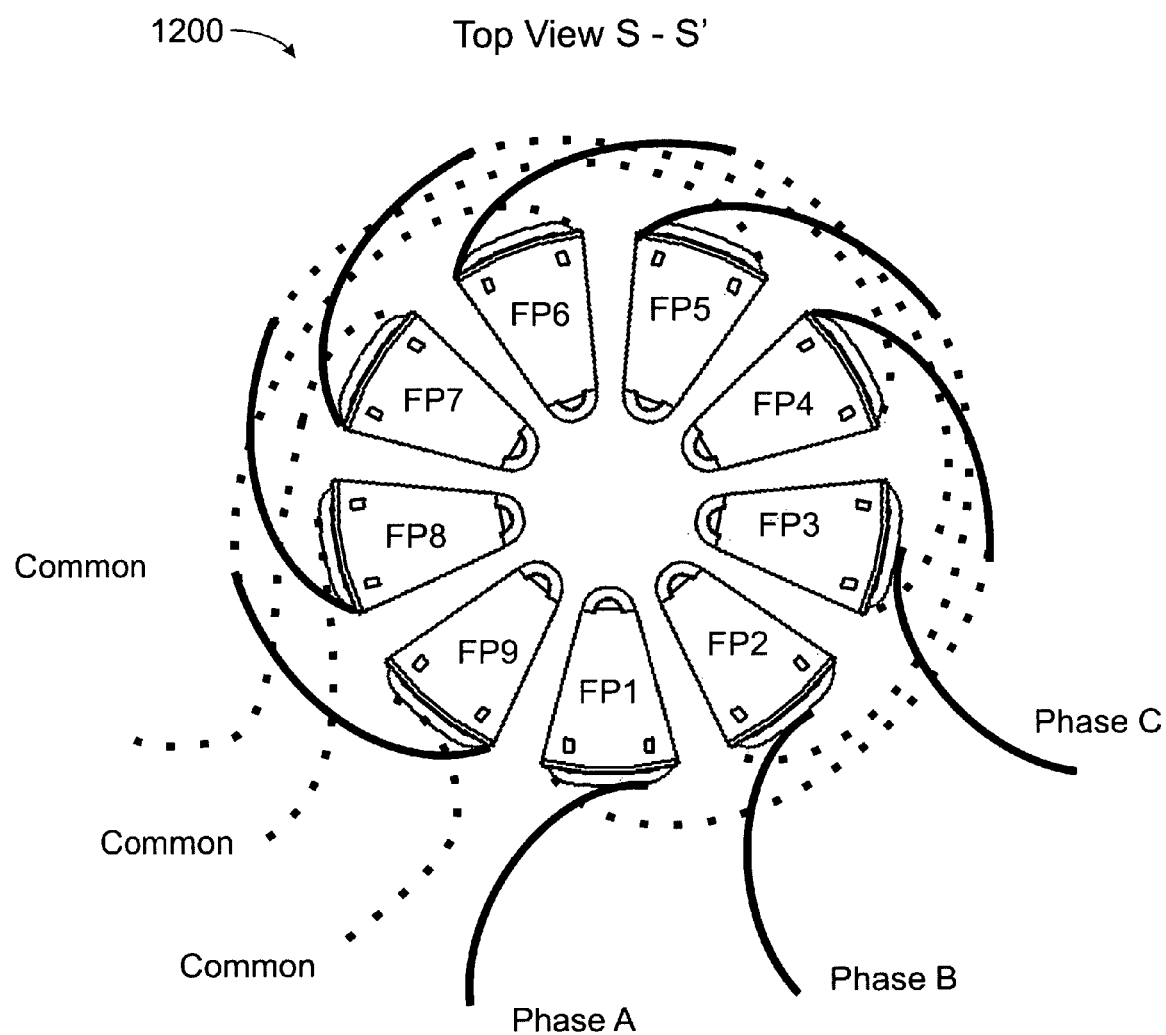

FIGS. 11 and 12 show yet another example of a foil configuration for a stator, according to an embodiment of the invention. FIG. 11 shows one set 1100 of three sets of three field poles that are coupled with a foil conductor 1102 that includes transition portions 1104 that are configured to transition foil conductor 1102 from an upper level (i.e., a first region) to a lower level (i.e., a second region) viewed from top view S-S' at a point 1106, which can be, for example, approximately two thirds of the distance between field pole members in a final configuration, as shown in diagram 1200 of FIG. 12. As used herein, the term "transition portion" can refer, at least in some embodiments, to an offset portion that need not be disposed between two coils associated with the same field pole member, but rather can refer to a portion of a foil conductor that transitions the foil conductor from one region to another, with the two coils being associated with different field pole members. In some cases, a transition region can be located at any position between field pole members. The transition region can be oriented to be adjacent to another field pole member of another subset of field pole members.

As shown in FIG. 12, the three sets of three active field pole members (i.e., 9 field pole members in total) can be assembled in an interleaved or interlaced manner to allow the foils on the upper level or region (i.e., as shown in dotted lines) to properly dress. This scheme enables the same wrapping pattern to be implemented on all three sets of field poles, which can simplify manufacturing. To illustrate one example of assembling a stator, consider that field pole members FP1, FP4, and FP7 constitute an initial subset of field pole members, to which field poles FP2, FP5, and FP8 are added thereto as a next subset of field pole members. Then, field pole members FP3, FP6, and FP9 are added as another subset of field pole members to form a stator. In one example, transition region 1104 is positioned to be radially adjacent to field pole member N+2, or field pole member PF3. Note that while FIGS. 11 and 12 show a foil conductor wrap configuration for a nine field pole and six magnet pole electrodynamic machine, the above-described techniques can extend to configurations with additional evenly-spaced field poles in each phase, as well as any number of field pole members, phases and/or regions.

Figure 13:
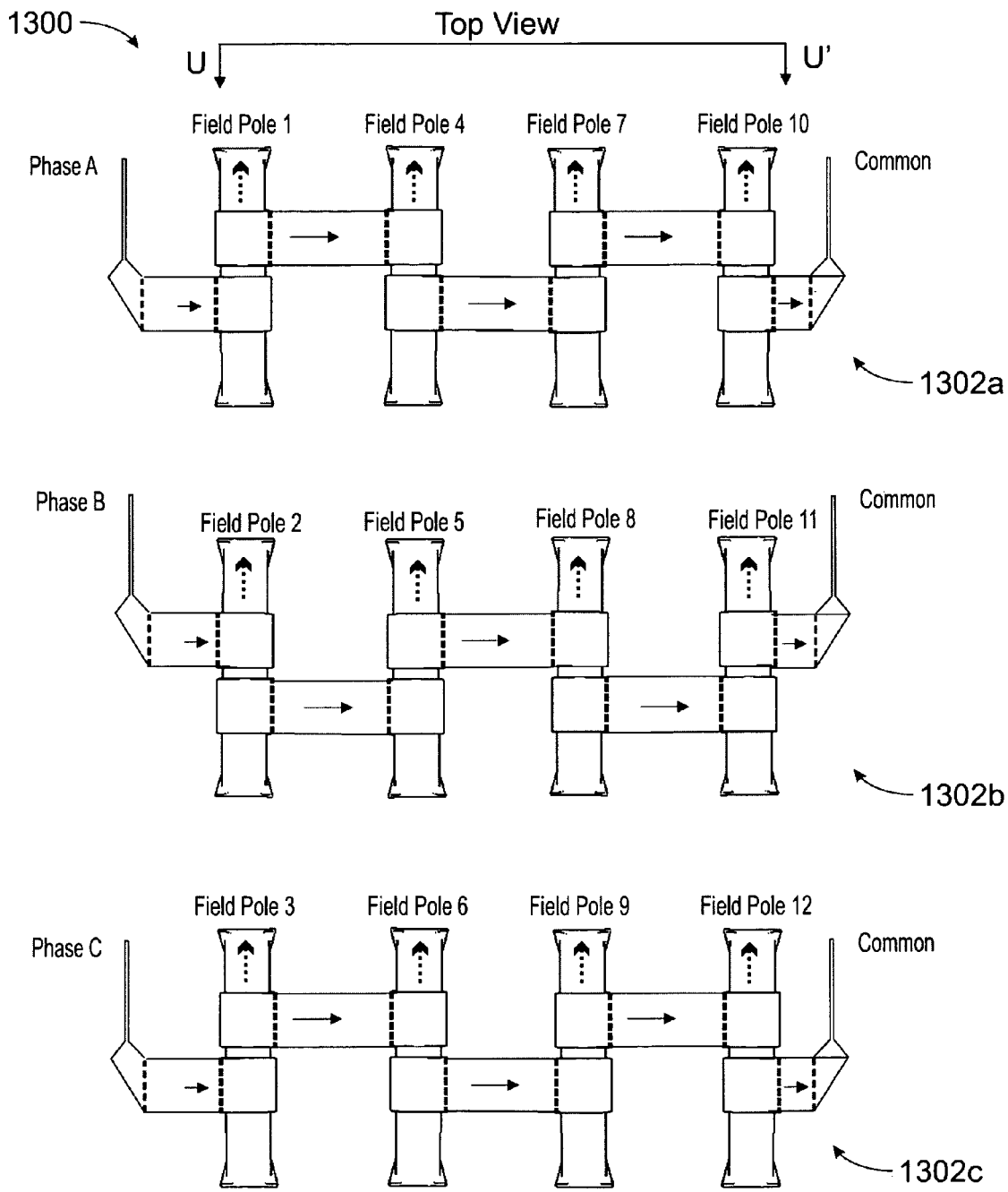
FIGS. 13 and 14 show still yet another example of a foil configuration for a relatively higher-numbered set of field pole members, according to an embodiment of the invention.
Figure 14:
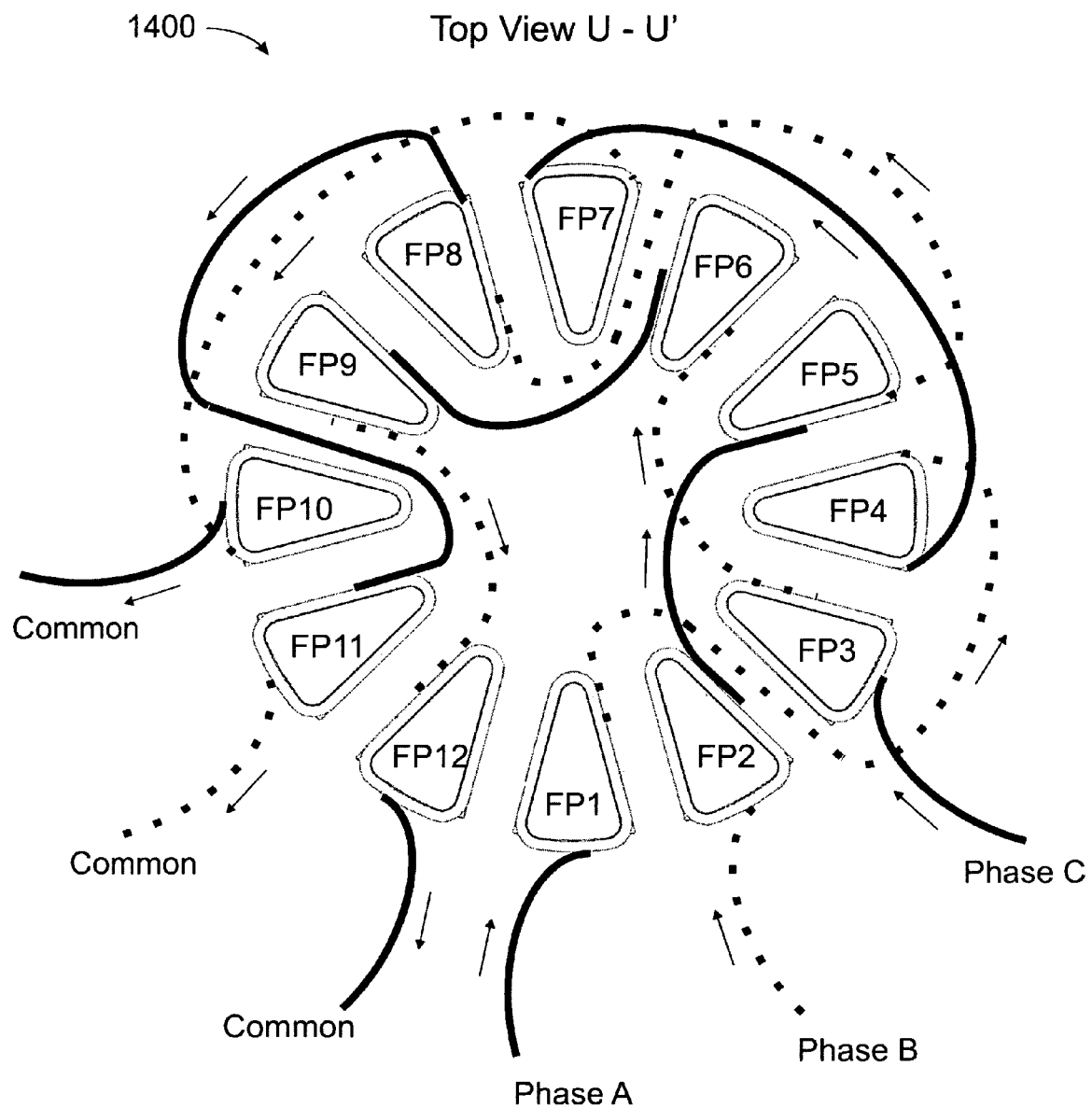

FIGS. 13 and 14 show still yet another example of a foil configuration for a relatively higher-numbered set of field pole members, according to an embodiment of the invention. FIG. 13 is a diagram 1300 showing three sets 1302a, 1302b, and 1302c of field pole members in a top view U-U', each of which can include four field pole members, thereby providing for a twelve field pole members for an eight magnet pole configuration. FIG. 14 is a top view ("U-U'") 1400 showing that three sets 1302*a*, 1302*b*, and 1302*c* of field pole members can be assembled into a stator without any of the foils in the lower region (e.g., shown in solid lines) or in the upper regions (e.g., as shown in dashed lines) that interfere with or cross each other.

In view of the foregoing, FIGS. 7 to 14 provide representative foil conductor wrap configurations and patterns for specific combinations of field pole members and magnet poles. These figures are merely illustrative of the various foil conductor wrap configurations and patterns that are provided by the various embodiment of the invention. As such, an ordinarily skilled artisan can recognize how to employ the techniques described herein to implement other foil conductor wrap configurations. Also, the interlacing patterns shown for the specific configurations in FIGS. 7 to 14 are just a few examples of the many ways in which to integrate subsets of field pole member to form stators. Interlacing patterns are patterns of conductors (e.g., foil conductors) that interweave the foil conductors relative to field pole members to lace together or couple the field pole members, for example, by passing at least some of the foil conductors through the center of the stator, into and/or out of the center of the stator, and/or through the external boundary of the stator.

Figure 15:
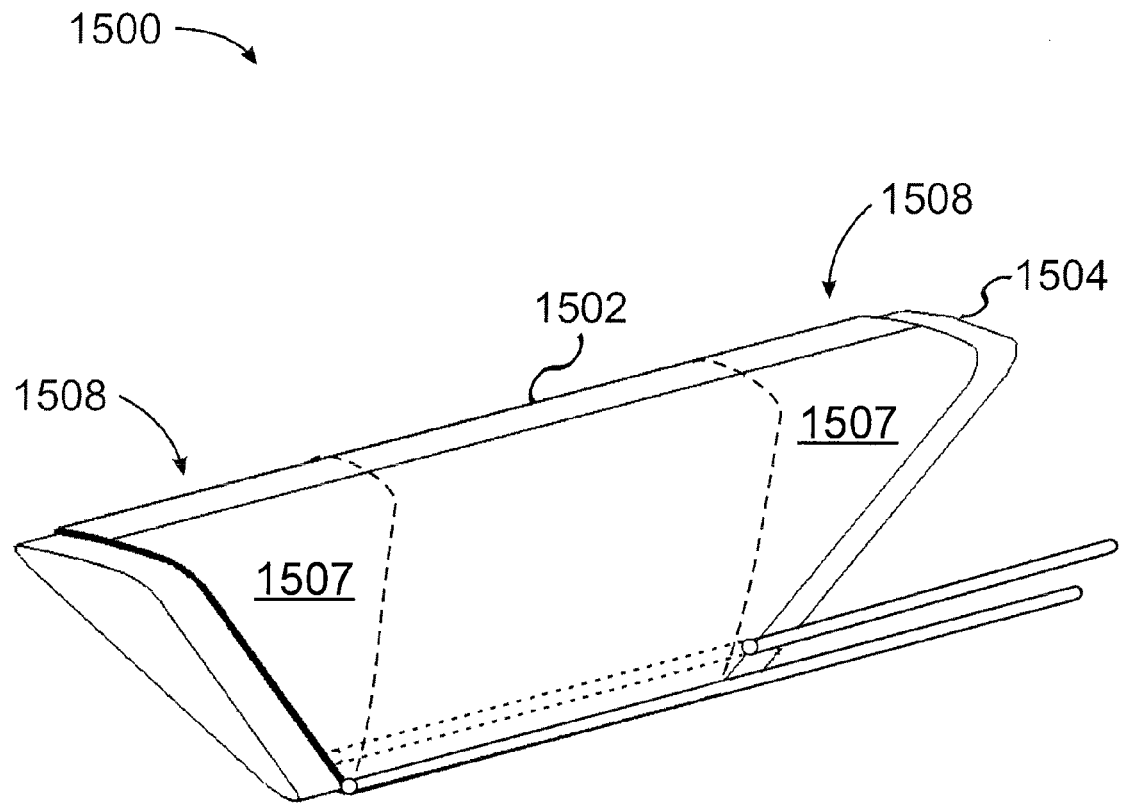

FIGS. 15 to 18 depict various implementations of a coil structure implementing a variable width foil conductor, according to various embodiments of the invention. FIG. 15 is a diagram showing an active field pole member 1500 implementing a coil structure 1502 disposed on (e.g., wound about) a field pole member 1504. By implementing portions 1507 of coil structure 1502 that are disposed on pole shoe portions 1508, magnetic flux leakage can be reduced that otherwise would exist if pole shoe portions 1508 are not covered by the foil conductor.

Figure 16:
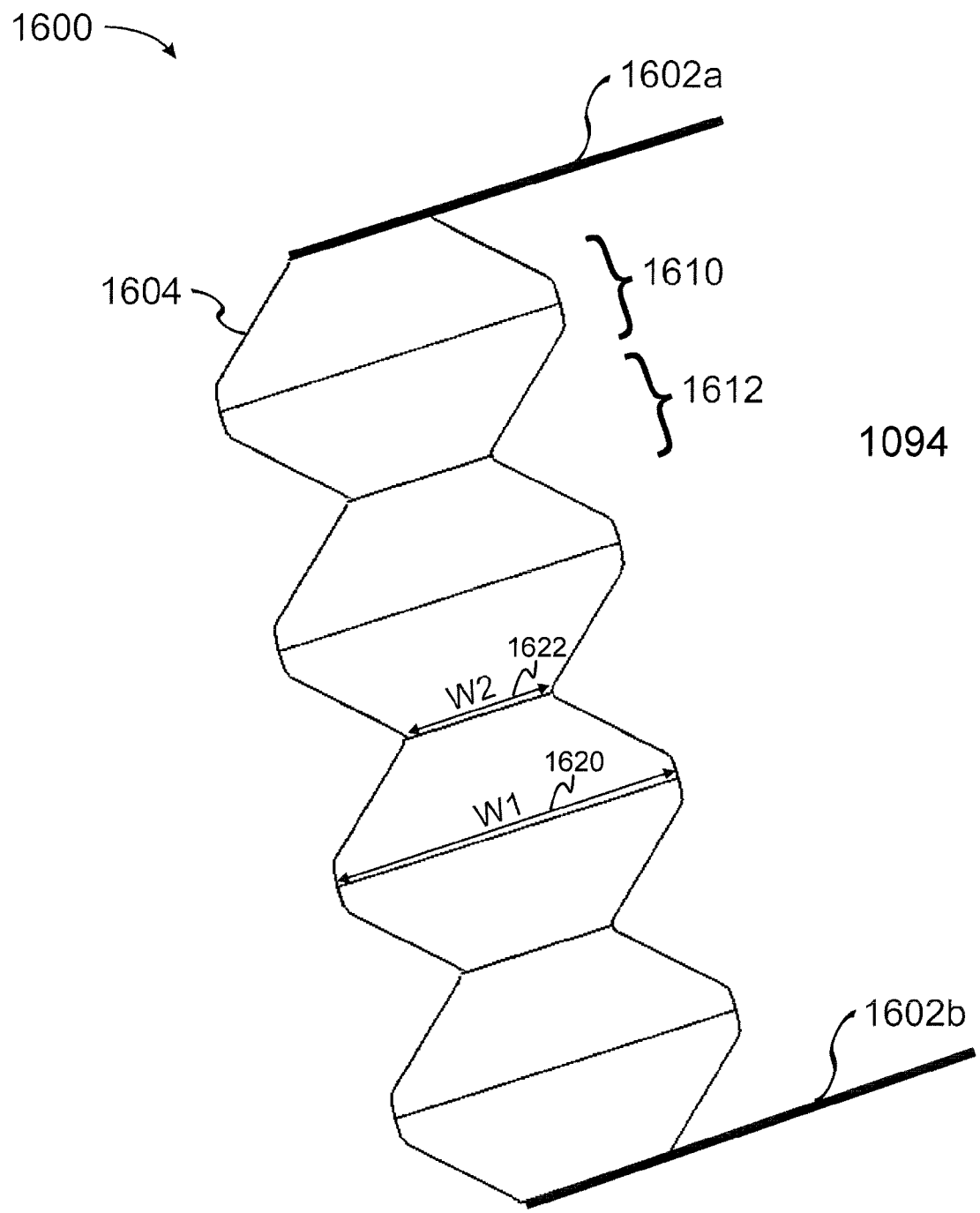

FIG. 16 is a coil structure implementing a foil conductor having variable width, according to an embodiment of the invention. Coil structure 1600 includes foil conductor 1604, which has a variable width, and leads 1602*a* and 1602*b*. In particular, foil conductors 1604 includes one or more of first foil conductor portions 1612 that are configured to expose a pole face of a field pole member, and one or more of second foil conductor portions 1610 that are configured to cover another pole shoe portion. Note that portions 1612 can be configured to align with a bottom of a field pole member (e.g., nearest to an axis of rotation) and portions 1610 can be configured to align with a top of the field pole member (e.g., farthest from an axis of rotation, and, for example, at the external boundary region of the stator) when disposed on (e.g., wound about) a field pole member. In at least one embodiment, the variable width of foil conductor 1604 can reduce the average resistance of the overall foil winding compared to the foil winding shown in FIG. 2 with width "W2," which can be relatively constant (at least in some cases), because foil conductor 1604 includes wider portions ("W1") 1620, which have a lower resistance than narrow portions ("W2") 1622.

Figure 17:
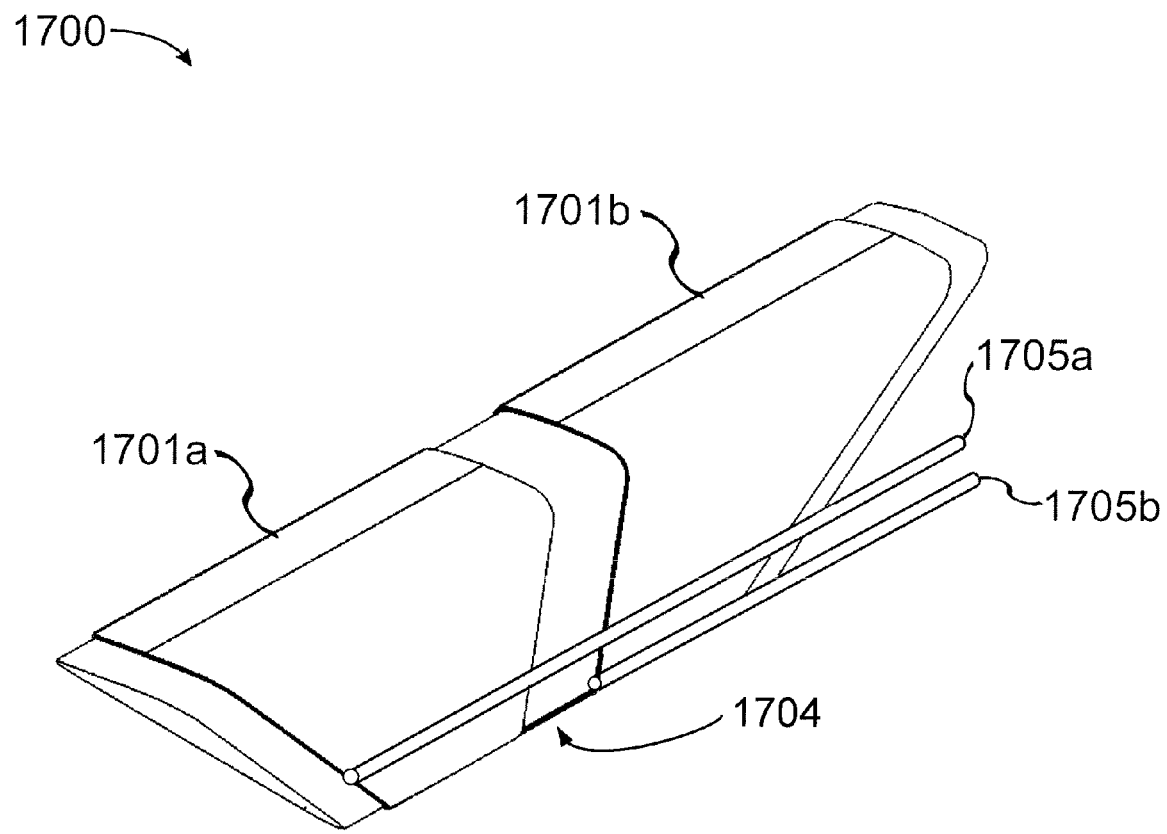

FIG. 17 shows an active field pole member implementing multiple foil conductor portions, according to an embodiment of the invention. Active field pole member 1700 includes multiple foil conductor portions 1701*a* and 1701*b*, which form a gap 1704. Foil conductor portions 1701*a* and 1701*b* can be respectively coupled to leads 1705*a* and 1705*b*. Or, leads 1705*a* and 1705*b* can coupled to one of foil conductor portions 1701 a and 1701*b*, with the other foil conductor portion being coupled to other leads (not shown). In at least some embodiments, conductor portions 1701*a* and 1701*b* can be coupled via an offset portion (not shown). In various embodiments, multiple conductor portions 1701*a* and 1701*b* can include any number of conductor portions at any number of coil regions, with each pair of coils including separate leads.

Figures 18A, 18B:
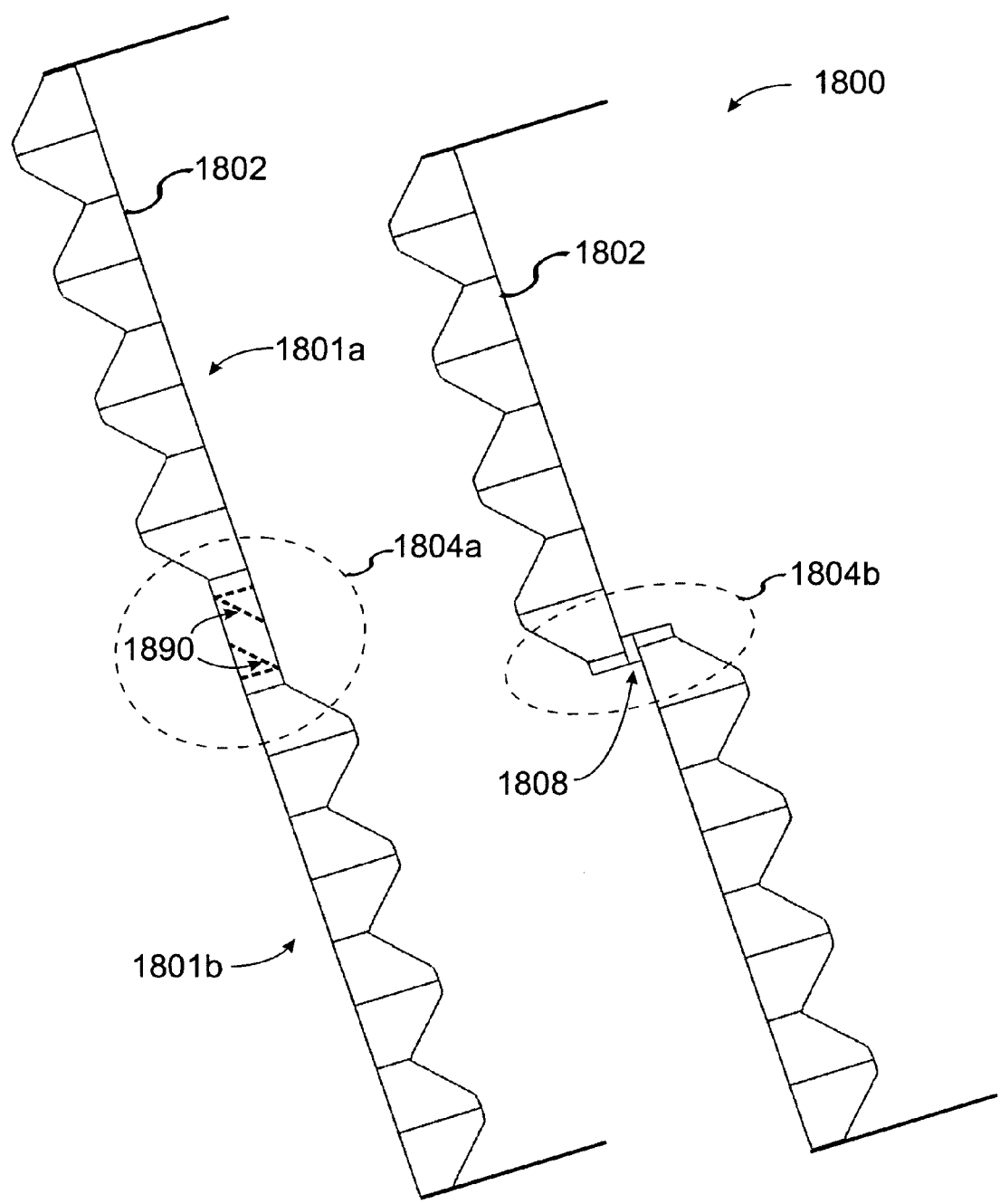

FIGS. 18A and 18B show examples of foil conductors, and an example of one type of fold pattern used to create the multiple foil conductor portions offset by a gap, according to at least some of the embodiments of the invention. FIG. 18A shows a foil conductor 1802 including an offset portion 1804 for generating multiple foil conductor portions 1801*a* and 1801*b*. FIG. 18A shows offset portion 1804 including fold pattern lines 1890, that when foil conductor 1802 (shown as a pre-wrapped foil conductor) is folded along fold pattern lines 1890. FIG. 18B shows a foil conductor 1802 (shown as a post-wrapped foil conductor) including an offset portion 1804 that has been folded to generate a gap 1808. In at least some embodiments, foil conductor 1802 can implement one or more foil conductor portions instead of the leads shown in FIGS. 18A and 18B, with additional foil conductor portions 1801*a* and 1801*b* (not shown) optionally being implemented to, for example, provide for variable width foil conductors to couple field poles members in a subset, such as one or more of subsets shown in FIG. 13. Thus, subsets 1302*a*, 1302*b*, and 1302*c* of FIG. 13, or any other structure described or referred to herein, can be configured to use variable width foil conductors.

While some of the examples for foil conductor structures and methods of forming the same are shown to include folded portions, at least some embodiments need not implement folded foil conductor portions or folding patterns as described, for example, in FIG. 5. In at least some embodiments, an offset portion can be formed without using folded portions of a conductor. For example, an offset portion can be formed by using a die (or any other cutting technique, as using a laser to cut the conductor) to cut a sheet of foil into foil conductors, whereby the foil conductor includes an offset portion.

Figure 19A:
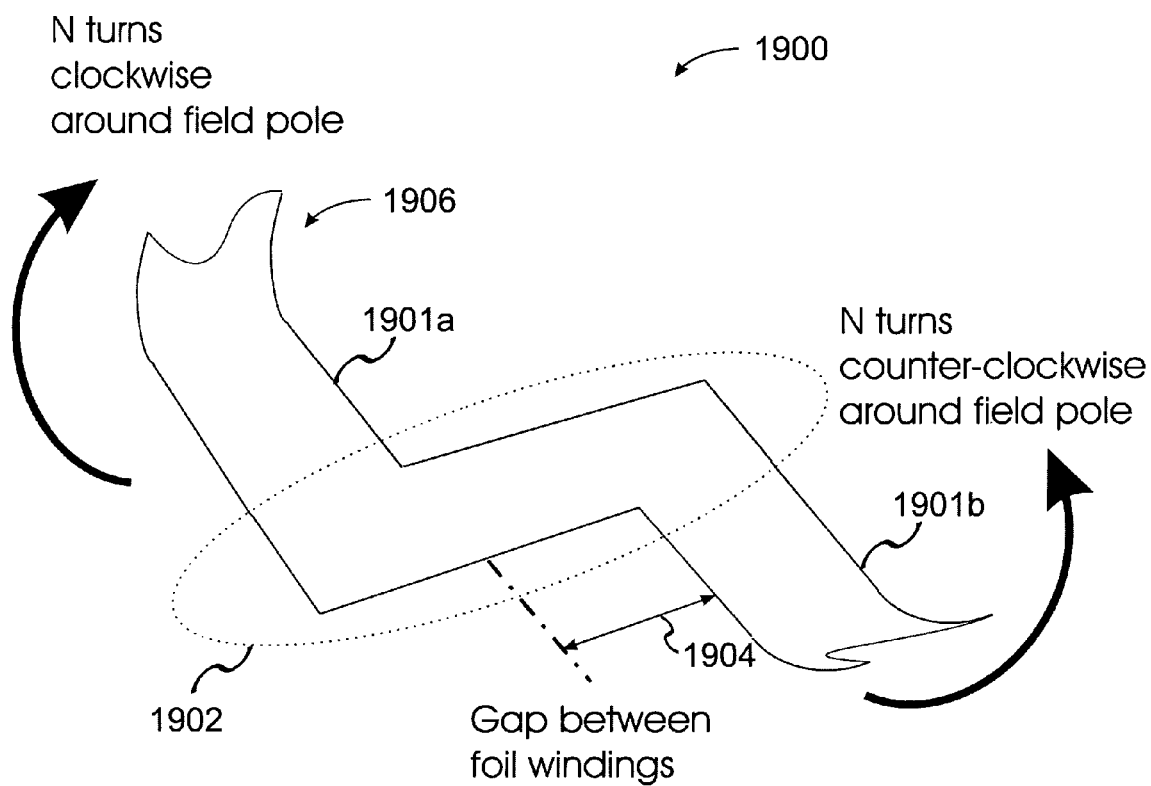
FIG. 19A depicts a portion of a coil structure including an offset portion, according to at least some embodiments of the invention.
Figure 19B:
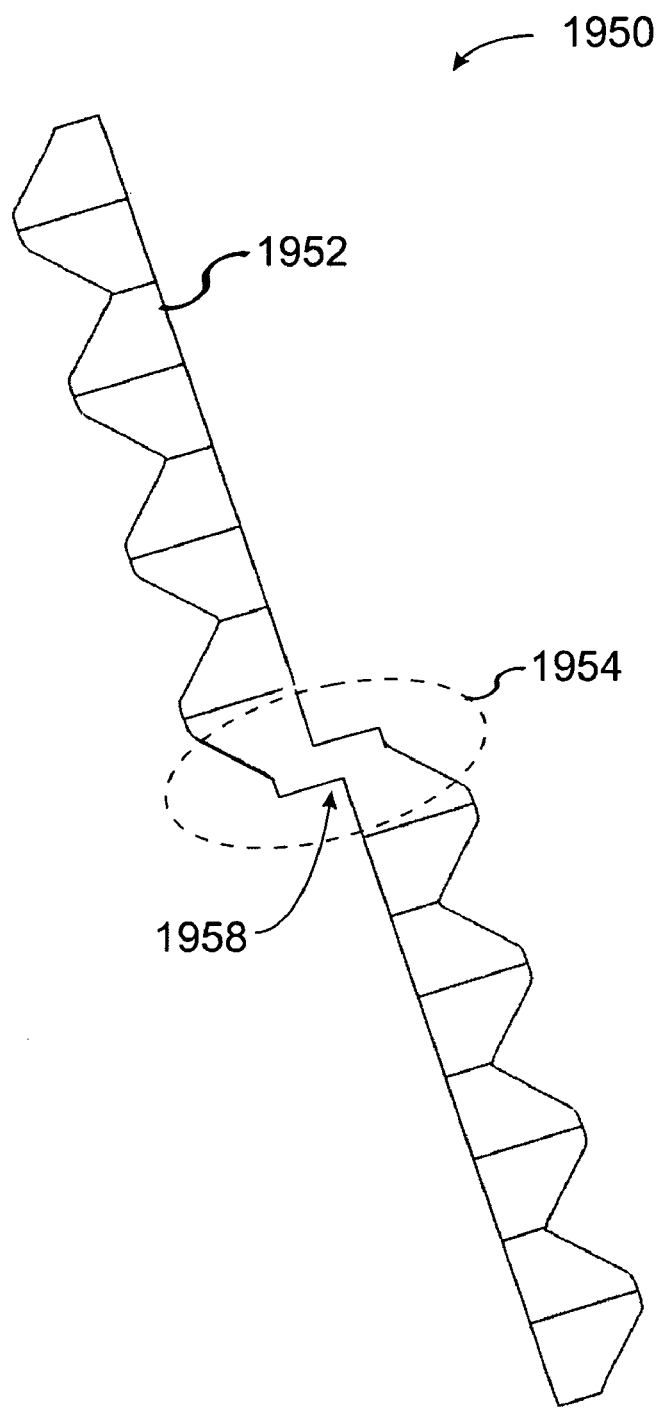
FIG. 19B shows a foil conductor including an offset portion formed to generate a gap, according to at least some embodiments of the invention.

FIG. 19A depicts a portion of a coil structure including an offset portion, according to at least some embodiments of the invention. Coil structure portion 1900 is shown to include an offset portion 1902 formed in a foil conductor 1906. Offset portion 1902 is configured to form multiple foil conductor portions 1901*a* and 1901*b* and to form a gap 1904 therebetween. As such, multiple foil conductor portions 1901*a* and 1901*b* can be wound about different regions (not shown) of a field pole member. In at least some embodiments, a foil conductor portion, such as either of foil conductor portions 1901*a* and 1901*b*, can be configured to be disposed on a corresponding coil region on a field pole member. In the example shown, offset portion 1902 is formed from a foil conductor that is monolithic, such that foil conductor portion 1901*a* is monolithic with foil conductor portion 1901*b*. In at least some embodiments, offset portion 1902 can be formed from other conductive material and coupled to foil conductor portions 1901*a* and 1901*b*. Note that each of foil conductor portions 1901*a* and 1901*b* can have any number of turns, and need not be limited to the same number of turns, and can be wound in opposite directions (e.g., clockwise and counter-clockwise) relative to offset portion 1902, such that a current passing though each of foil conductor portions 1901*a* and 1901*b* can induce ampere-turn ("AT") flux in a field pole member in the same direction. FIG. 19B shows a variable width foil conductor 1952 including an offset portion 1954 that has been formed (e.g., cut) to generate a gap 1958 without needing to fold the conductor as was required in FIG. 18B.

Figure 20A:
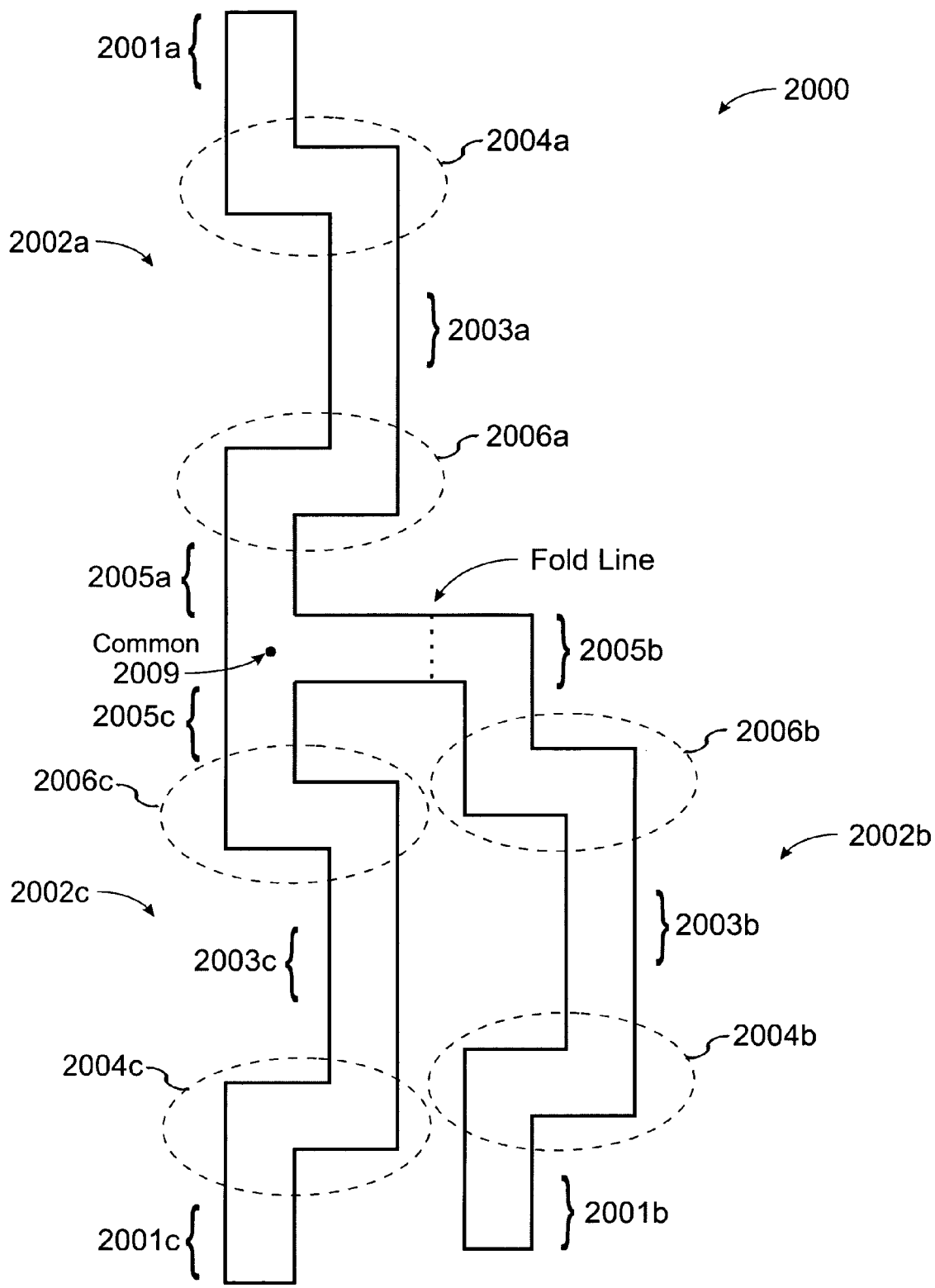
FIGS. 20A and 20B depict other examples of coil structures, according to at least some embodiments of the invention.
Figure 20B:
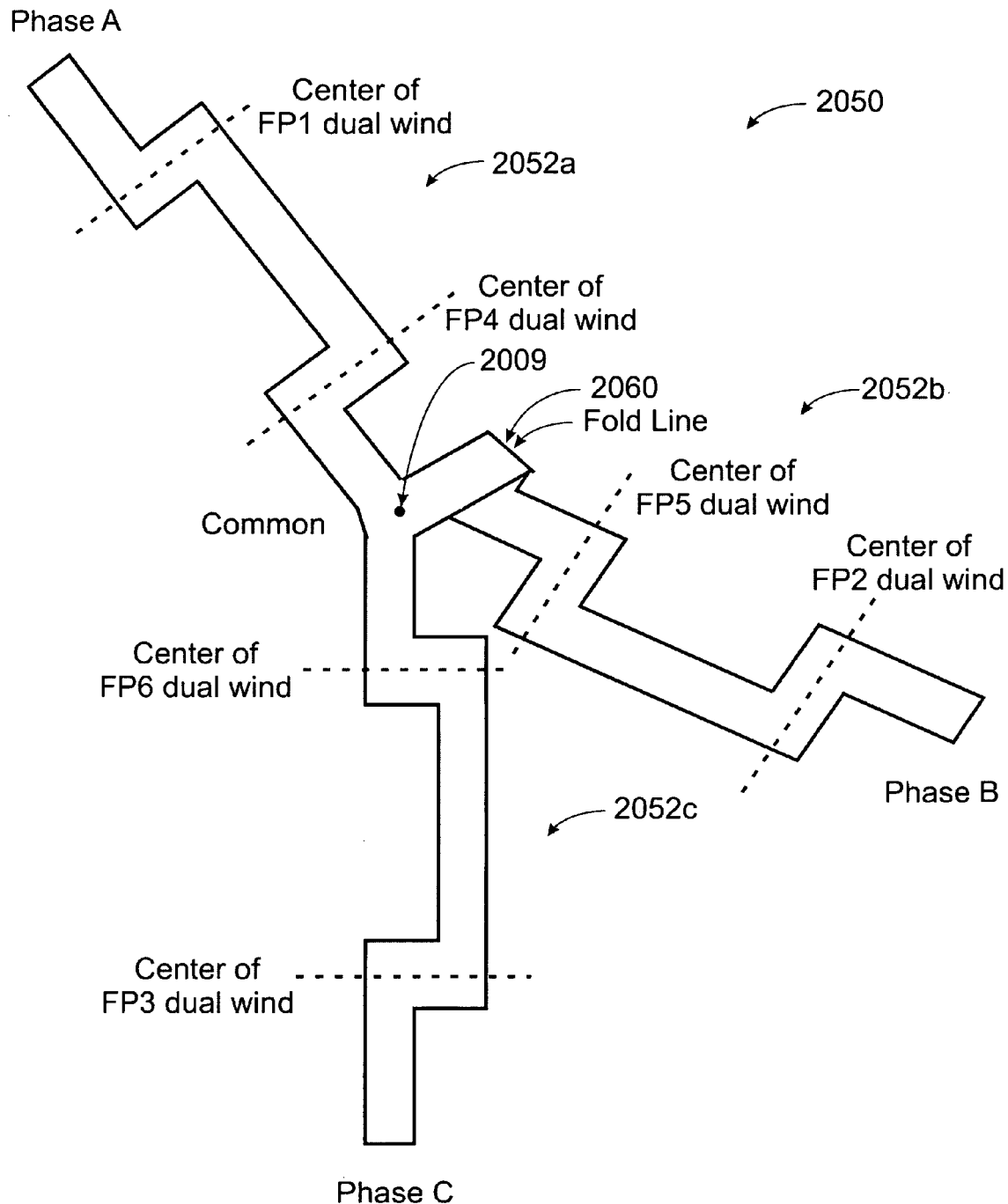

FIGS. 20A and 20B depict another set of examples of coil structures, according to at least some embodiments of the invention. As is shown in FIG. 20A, a coil structure 2000 is composed of coil structure portion 2002a to be wound on a first subset of field pole members, coil structure portion 2002b to be wound on a second subset of field pole members, and coil structure portion 2002c to be wound on a third subset of field pole members. The example of the coil structure in FIG. 20A can be cut from a sheet of foil using a cutting pattern to form the shape shown. In the example shown, the dimensions of coil structure 2000 are not to scale. For instance, the vertical (i.e., length) dimensions have been reduced, as compared to the horizontal (i.e., width) dimensions for clarity. In this example, coil structure portions 2002a, 2002b, and 2002c are coupled at common point 2009. In particular, coil structure portions 2002a, 2002b, and 2002c can be configured as foil conductors monolithically coupled together (i.e., not formed from separate conductors) at common point 2009, thereby obviating the use of separate leads for a particular subset of leads (e.g., lead for a common phase), which, in turn, provides monolithic interconnections for coil structure portions 2002a, 2002b, and 2002c. Thus, three leads for a stator are sufficient to apply phases A, B, C. Optionally, a lead can be used to common point 2009 to a common.

Coil structure portions 2002a, 2002b, and 2002c, when wound on field poles, can be similar in structure and/or function as subsets 702a, 702b, and 702c of FIG. 7 to respectively facilitate application of phase currents A, B, and C. Foil conductor portions 2001a, 2001b, and 2001c are configured to provide for "lead in" leads (not shown), similar to foil conductor portions 701a, 701b, and 701c of FIG. 7, whereas foil conductor portions 2005a, 2005b, and 2005c are configured to provide for "lead out" leads to, for example, common, similar to foil conductor portions 705a, 705b, and 705c of FIG. 7. Foil conductor portions 2003a, 2003b, and 2003c are configured to provide similar structures and/or functions as foil conductor portions 703a, 703b, and 703c of FIG. 7, but in this case are monolithically interconnected. Also shown are offset portions 2004a, 2006a, 2004b, 2006b, 2004c, and 2006c that are configured to offset the foil conductor portions to adapt the foil conductors to different coil regions of the field pole members.

FIG. 20B depicts the coil structure of FIG. 20A folded to allow the coils to be wound on the respective field poles in a pattern similar to that used in FIG. 7, according to at least some embodiments of the invention. In particular, Phase B will have "Lead In" and "Lead Out" leads on the upper region of the Field Poles 2 and 5 while Phase A and C will have "Lead In" and "Lead Out" leads in the lower region of their respective field poles. This facilitates an assembly scheme similar to that described in FIGS. 8A-8D to form an assembled stator. The resulting stator has monolithic connections internal to the assembly, which can be particularly advantageous when the coil structure is fabricated from aluminum foil or some other conductor that is difficult to reliably interconnect. According to at least some embodiments of the invention, the coil structures shown in FIGS. 20A and 20B can implement variable width foil conductors and another structure or function described herein.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. For example, although the above description of the embodiments relate to a motor, the discussion is applicable to all electrodynamic machines, such as to a generator.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. It is intended that the following claims and their equivalents define the scope of the invention.

The invention claimed is:

1. A stator for electrodynamic machines comprising:
a coil structure configured to generate ampere-turn ("AT") flux, the coil structure comprising:
a foil conductor including:
an offset portion of the foil conductor configured to offset portions of the foil conductor;
a first field pole member having multiple regions at which the portions of the foil conductor are disposed on the first field pole member, the first field pole member comprising:
a first region and a second region, a first portion of the foil conductor disposed at the first region and a second portion of the foil conductor at the second region, the offset portion of the foil conductor coupling the first portion of the foil conductor to the second portion of the foil conductor; and
a magnetically permeable material,
wherein the first portion of the foil conductor and the second portion of the foil conductor are configured to generate portions of the ampere-turn ("AT") flux in the magnetically permeable material associated with the first region and the second region, respectively,
wherein the first portion of the foil conductor is wound about the first region in a clockwise direction and the second portion of the foil conductor is wound about the second region in a counter clockwise direction; and
a second field pole member around which the foil conductor is wound,
wherein the foil conductor extends contiguously between the first field pole member and the second field pole member.

2. The stator of claim 1 wherein the foil conductor is wound in the clockwise direction and in the counter clockwise direction relative to an axis of rotation.

3. The stator of claim 1 wherein the foil conductor wound about the first field pole member and the second field pole member comprises:
a monolithic foil conductor.

4. The stator of claim 1 wherein the second portion of the foil conductor comprises:
a foil-based lead.

5. The stator of claim 1 wherein the foil conductor comprises:
a monolithic foil conductor having a variable width.

6. The stator of claim 1 wherein the offset portion of the foil conductor comprises:
folded portions of the foil conductor.

7. The stator of claim 1 wherein the coil structure comprises:
- a plurality of monolithic foil conductor portions coupled at a monolithic interconnection point, the plurality of monolithic foil conductor portions and the monolithic interconnection point being composed of a contiguous conductor.

8. The stator of claim 1 wherein the second portion of the foil conductor comprises:
- a lead including a plurality of folded portions that are fold upon each other, the plurality of folded portions including:
- a current density enhancement portion configured to provide a cross-sectional area for the lead that is equivalent to a cross-sectional area at the width of the elongated coil.

9. The stator of claim 8 wherein the foil conductor comprises:
- a non-lead region;
- a lead region that includes the plurality of the folded portions:, and
- one or more diagonal slits configured to determine the non-lead region and the lead region and further configured to produce the current density enhancement portion,
- wherein a portion of the lead region is folded onto a portion of the non-lead region to form the current density enhancement portion.

10. The stator of claim 1 further comprising:
- a subset of field pole members coupled via the foil conductor, the subset of field pole members including the first field pole member and another field pole member to form two field pole members that are coupled together by the first portion of the foil conductor;
- another foil conductor including:
- another offset portion of the another foil conductor configured to offset portions of the another foil conductor; and
- another subset of the field pole members coupled via the another foil conductor, the another subset including another two field pole members that comprise:
- a first region and as second region, a first portion of the another foil conductor coupling the another two field pole members at the first region, and at least one of the another two field pole members including a second portion of the another foil conductor at the second region.

11. The stator of claim 10 wherein the foil conductor and the another foil conductor are monolithic.

12. The stator of claim 1 wherein the foil conductor is configured to pass between the first field pole member and the second field pole member through an exterior boundary region of the stator being disposed circumferentially about an axis of rotation at an outer radial distance coextensive with exterior circumferential edges of the first field pole member and the second field pole member.

13. The stator of claim 1 wherein the foil conductor is configured to pass between the first field pole member and the second field pole member through a center region of the stator being disposed circumferentially about an axis of rotation at an inner radial distance coextensive with interior circumferential edges of the first field pole member and the second field pole member.

14. The stator of claim 1 wherein at least one of the first and the second field pole members comprises:
- a pole face having a surface portion oriented an acute angle relative to a longitudinal centerline passing parallel to an axis of rotation in the center of the stator.

15. The stator of claim 1 wherein at least one of the first and the second field pole members comprises:
- a substantially straight field pole member.

16. The stator of claim 1 wherein the first portion of the foil conductor and the second portion of the foil conductor are arranged in series on the field pole member parallel to an axis of rotation.

17. The stator of claim 1 wherein the first field pole member and the second field pole member are arranged parallel to an axis of rotation.

18. The stator of claim 17 wherein the first field pole member and the second field pole member are arranged parallel to an axis of rotation and each include pole faces disposed at ends of the first field pole member and the second field pole member,
- wherein the foil conductor extends contiguously from the first field pole member to the second field pole member between the pole faces.

19. A stator for an axial-based electrodynamic machine comprising:
- a plurality of subsets of field pole members configured to use multiple coil regions, each of the subsets of the field pole members being associated with a phase, the field pole members being arranged parallel to an axis of rotation and having a pole face disposed at each end; and
- a plurality of foil conductors wound about the multiple coil regions to generate ampere-turn ("AT") flux in axial directions, each of the foil conductors having a contiguous structure between a first end and a second end disposed longitudinally from each other,
- wherein a foil conductor is wound about a subset of field pole members, the subset of field pole members including two or more field pole members disposed between the first end and the second end of the foil conductor,
- wherein portions of the foil conductor coupling the two or more field pole members is disposed between pairs of pole faces of the two or more field pole members, each pair of pole faces being associated with a field pole member.

* * * * *